US012772291B2

(12) United States Patent
He et al.

(10) Patent No.: US 12,772,291 B2
(45) Date of Patent: Oct. 20, 2026

(54) BTOIP LOW POWER DESIGN WITH ADAPTIVE LOW POWER MODE AND DATA BURST INTERVAL

(71) Applicant: QUALCOMM INCORPORATED, San Diego, CA (US)

(72) Inventors: Rong He, San Diego, CA (US); Sandip Homchaudhuri, San Jose, CA (US); Hemant Gupta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 18/709,467

(22) PCT Filed: Mar. 17, 2022

(86) PCT No.: PCT/US2022/020777

§ 371 (c)(1),
(2) Date: May 10, 2024

(87) PCT Pub. No.: WO2023/146564

PCT Pub. Date: Aug. 3, 2023

(65) Prior Publication Data

US 2025/0039932 A1 Jan. 30, 2025

(30) Foreign Application Priority Data

Jan. 26, 2022 (IN) ............................ 202241004352

(51) Int. Cl.
*H04W 4/80* (2018.01)
*H04B 7/06* (2006.01)
(Continued)

(52) U.S. Cl.
CPC ...... *H04W 74/0816* (2013.01); *H04B 7/0626* (2013.01); *H04W 28/0278* (2013.01); *H04W 76/12* (2018.02)

(58) Field of Classification Search
CPC ... H04B 7/0626; H04L 12/64; H04L 12/6418; H04L 12/66; H04W 4/80;
(Continued)

(56) References Cited

U.S. PATENT DOCUMENTS 10,708,810 B2 * 7/2020 Wang ...................... H04L 47/30
11,963,097 B2 * 4/2024 Seok .................. H04W 74/006
(Continued)

FOREIGN PATENT DOCUMENTS

WO WO-2016105568 A1 6/2016
WO WO-2021066283 A1 4/2021

OTHER PUBLICATIONS

International Search Report and Written Opinion—PCT/US2022/020777—ISA/EPO—Oct. 17, 2022 (2200285WO).

*Primary Examiner* — Frank Duong
(74) *Attorney, Agent, or Firm* — Holland & Hart LLP

(57) ABSTRACT

This disclosure describes techniques for transmitting Bluetooth data over a contention-based communication link (such as a P2P link). In some instances, a wireless device transmits, to a Bluetooth-enabled peripheral device over the contention-based communication link, one or more first data packets based on a set of transmission parameters. The wireless device receives, from the Bluetooth-enabled peripheral device, a buffer status report carrying feedback information indicating one or more of a quantity of data packets queued in a receive buffer of the peripheral device, a rate at which the data packets are queued in the receive buffer, or time-of-arrival (TOA) information of the data packets queued in the receive buffer. The wireless device adjusts the set of transmission parameters based on the feedback information, and transmits, to the Bluetooth-enabled peripheral device over the contention-based commu-
(Continued)

600 nication link, one or more second data packets based on the adjusted set of transmission parameters.

17 Claims, 16 Drawing Sheets

(51) Int. Cl.
*H04W 28/02* (2009.01)
*H04W 74/0816* (2024.01)
*H04W 76/12* (2018.01)

(58) Field of Classification Search
CPC ......... H04W 28/0221; H04W 28/0236; H04W 28/0278; H04W 40/26; H04W 52/0229; H04W 74/0816; H04W 76/12; Y02D 30/70
See application file for complete search history.

(56) References Cited

U.S. PATENT DOCUMENTS

| | | | | |
|---|---|---|---|---|
| 12,114,267 | B2 * | 10/2024 | Hu | H04W 28/0273 |
| 12,256,267 | B2 * | 3/2025 | Kim | H04W 28/0268 |
| 2016/0192114 | A1 * | 6/2016 | Sole | H04L 65/65<br>455/41.3 |
| 2017/0332385 | A1 * | 11/2017 | Shirali | H04W 28/0278 |
| 2020/0413285 | A1 | 12/2020 | Li et al. | |
| 2021/0037464 | A1 * | 2/2021 | Cariou | H04W 52/0229 |
| 2021/0058936 | A1 | 2/2021 | Gordaychik | |
| 2022/0264463 | A1 * | 8/2022 | Li | H04W 24/04 |

* cited by examiner

BTOIP LOW POWER DESIGN WITH ADAPTIVE LOW POWER MODE AND DATA BURST INTERVAL

CROSS-REFERENCE TO RELATED APPLICATIONS

The present application is a 371 national stage filing of International PCT Application No. PCT/US2022/020777 by H E et al. entitled "BTOIP LOW POWER DESIGN WITH ADAPTIVE LOW POWER MODE AND DATA BURST INTERVAL," filed Mar. 17, 2022; and claims priority to Indian patent application No. 202241004352 by H E et al. entitled "BTOIP LOW POWER DESIGN WITH ADAPTIVE LOW POWER MODE AND DATA BURST INTERVAL," filed Jan. 26, 2022, each of which is assigned to the assignee hereof, and each of which is expressly incorporated by reference in its entirety herein.

TECHNICAL FIELD

This disclosure relates generally to wireless communications, and more specifically, to transmitting data to a Bluetooth-enabled device over a Wi-Fi channel.

DESCRIPTION OF THE RELATED TECHNOLOGY

A wireless personal area network (WPAN) is a short-range wireless network typically established by a user to interconnect various personal devices, sensors, and/or appliances located within a certain distance or area of the user. For example, WPANs based on communication protocols such as a Bluetooth® (BT) protocol, a Bluetooth® Low Energy protocol, or a Zigbee® protocol may provide wireless connectivity to peripheral devices within a specific distance (such as 5 meters, 10 meter, 20 meters, 100 meters, etc.) of the user.

Bluetooth is a short-range wireless communication protocol that supports a WPAN between a central device (such as a host device) and at least one peripheral device (such as a client device). Power consumption associated with Bluetooth communications may render Bluetooth impractical in certain applications.

To address the power consumption issue associated with Bluetooth, Bluetooth® Low Energy (BLE) was developed and adopted in various applications in which data transfers are relatively infrequent. Specifically. BLE exploits the infrequent transfer of data by using a low duty cycle operation, and placing one or both the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE enabled smart phones, tablets, and laptops. While traditional Bluetooth and BLE offer certain advantages, there exists a need for further improvements in Bluetooth and BLE technology. For example, traditional Bluetooth and BLE have limited range, have limited data capacity throughput, and are susceptible to interference from other devices communicating in the same frequency band (such as Wi-Fi communications).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented as a method for wireless communication by a wireless device. In some implementations, the method includes transmitting, to a Bluetooth-enabled peripheral device over a contention-based communication link, one or more first data packets based on a set of transmission parameters. The method includes receiving, from the Bluetooth-enabled peripheral device, a buffer status report (BSR) carrying feedback information indicating one or more of a quantity of data packets queued in a receive buffer of the peripheral device and time-of-arrival (TOA) information of the data packets queued in the receive buffer of the peripheral device. The method includes adjusting the set of transmission parameters based on the feedback information. The method includes transmitting, to the Bluetooth-enabled peripheral device over the contention-based communication link, one or more second data packets based on the adjusted set of transmission parameters.

In some instances, the contention-based communication link may be a wireless channel in a sub-GHz frequency band, a 2.4 GHz frequency band, a 5 GHZ frequency band, a 6 GHz frequency band, or a 60 GHz frequency band. In some other instances, the contention-based communication link may occupy one or more portions of another frequency band. In some implementations, the wireless device may be a smartphone, and the peripheral device may be one or more pairs of earbuds, one or more headphones, or one or more headsets. In some instances, the data packets may be part of an audio stream, a video stream, a latency-sensitive application, a real-time gaming application, and so on.

The set of transmission parameters may include (but is not limited to) one or more of a burst rate, a burst interval, a burst period, or a transmit power level. In some implementations, the wireless device may adjust the set of transmission parameters based on the feedback information. For example, in some instances, the wireless device may increase the burst rate responsive to the feedback information indicating that the quantity of data packets queued in the receive buffer is less than a value, or may decrease the burst rate responsive to the feedback information indicating that the quantity of data packets queued in the receive buffer is greater than the value. In other instances, the wireless device may decrease the burst interval responsive to the feedback information indicating that the quantity of data packets queued in the receive buffer is less than the value, or may increase the burst interval responsive to the feedback information indicating that the quantity of data packets queued in the receive buffer is greater than the value. In some other instances, the wireless device may increase the burst period responsive to the feedback information indicating that the quantity of data packets queued in the receive buffer is less than the value, or may decrease the burst period responsive to the feedback information indicating that the quantity of data packets queued in the receive buffer is greater than the value.

In other implementations, the wireless device may adjust the set of transmission parameters based on the TOA information. For example, in some instances, the wireless device may decrease the burst rate responsive to the TOA information indicating that the queued data packets arrived at the Bluetooth-enabled peripheral device within a time period, or may increase the burst rate responsive to the TOA information indicating that at least some of the queued data packets arrived at the Bluetooth-enabled peripheral device after the time period. In other instances, the wireless device may increase the burst interval responsive to the TOA information indicating that the queued data packets arrived at the Bluetooth-enabled peripheral device within the time period, or may decrease the burst interval responsive to the TOA information indicating that at least some of the queued data packets arrived at the Bluetooth-enabled peripheral device after the time period. In some other instances, the wireless device may decrease the burst period responsive to the TOA information indicating that the queued data packets arrived at the Bluetooth-enabled peripheral device within the time period, or may increase the burst period responsive to the TOA information indicating that at least some of the queued data packets arrived at the Bluetooth-enabled peripheral device after the time period.

In various implementations, the burst period may correspond to a Target Wake Time (TWT) Service Period (SP), and the burst interval may correspond to a TWT Service Interval (SI). The burst rate may correspond to a Modulation and Coding Scheme (MCS) rate or a PHY rate. In some implementations, the first and second data packets may carry latency-sensitive traffic, the burst period may correspond to a restricted Target Wake Time (r-TWT) SP, and the contention-based communication link may be one of a peer-to-peer (P2P) link, a tunneled direct-link setup (TDLS) link, a Wi-Fi Direct link, a link associated with a Group Owner (GO), or a link associated with a Neighborhood Area Network (NAN). In some implementations, the method also includes determining the TWT SI based on a timing synchronization function (TSF), determining a codec starting time based on the determined TWT SI, and determining a codec timestamp based on the determined codec starting time.

In some instances, the method may also include obtaining initial values for each parameter of the set of parameters based on a type or class of traffic carried in the data packets. In other instances, the method may also include adjusting a transmit power level at which to transmit the second data packets to the Bluetooth-enabled peripheral device based on the feedback information, and updating one or more TWT timing parameters based on the adjusted transmit power level. In some other instances, the method may also include selecting or changing a power save mode or sleep state of the wireless device based on the feedback information.

Another innovative aspect of the subject matter described in this disclosure can be implemented in a wireless device. In some implementations, the wireless device may include one or more wireless radios, one or more processors coupled to the one or more wireless radios, and a memory coupled to the one or more processors. In some implementations, the memory stores instructions that, when executed by the one or more processors in conjunction with the one or more wireless radios, is configured to transmit, to a Bluetooth-enabled peripheral device over a contention-based communication link, one or more first data packets based on a set of transmission parameters. Execution of the instructions may be configured to receive, from the Bluetooth-enabled peripheral device, a BSR carrying feedback information indicating one or more of a quantity of data packets queued in a receive buffer of the peripheral device or TOA information of the data packets queued in the receive buffer of the peripheral device. Execution of the instructions may be configured to adjust the set of transmission parameters based on the feedback information. Execution of the instructions may be configured to transmit, to the Bluetooth-enabled peripheral device over the contention-based communication link, one or more second data packets based on the adjusted set of transmission parameters.

In some instances, the contention-based communication link may be a wireless channel in a sub-GHz frequency band, a 2.4 GHz frequency band, a 5 GHZ frequency band, a 6 GHz frequency band, or a 60 GHz frequency band. In some other instances, the contention-based communication link may occupy one or more portions of another frequency band. In some implementations, the wireless device may be a smartphone, and the peripheral device may be one or more pairs of earbuds, one or more headphones, or one or more headsets. In some instances, the data packets may be part of an audio stream, a video stream, a latency-sensitive application, a real-time gaming application, and so on.

The set of transmission parameters may include (but is not limited to) one or more of a burst rate, a burst interval, a burst period, or a transmit power level. In some implementations, the wireless device may adjust the set of transmission parameters based on the feedback information. For example, in some instances, the wireless device may increase the burst rate responsive to the feedback information indicating that the quantity of data packets queued in the receive buffer is less than a value, or may decrease the burst rate responsive to the feedback information indicating that the quantity of data packets queued in the receive buffer is greater than the value. In other instances, the wireless device may decrease the burst interval responsive to the feedback information indicating that the quantity of data packets queued in the receive buffer is less than the value, or may increase the burst interval responsive to the feedback information indicating that the quantity of data packets queued in the receive buffer is greater than the value. In some other instances, the wireless device may increase the burst period responsive to the feedback information indicating that the quantity of data packets queued in the receive buffer is less than the value, or may decrease the burst period responsive to the feedback information indicating that the quantity of data packets queued in the receive buffer is greater than the value.

In other implementations, the wireless device may adjust the set of transmission parameters based on the TOA information. For example, in some instances, the wireless device may decrease the burst rate responsive to the TOA information indicating that the queued data packets arrived at the Bluetooth-enabled peripheral device within a time period, or may increase the burst rate responsive to the TOA information indicating that at least some of the queued data packets arrived at the Bluetooth-enabled peripheral device after the time period. In other instances, the wireless device may increase the burst interval responsive to the TOA information indicating that the queued data packets arrived at the Bluetooth-enabled peripheral device within the time period, or may decrease the burst interval responsive to the TOA information indicating that at least some of the queued data packets arrived at the Bluetooth-enabled peripheral device after the time period. In some other instances, the wireless device may decrease the burst period responsive to the TOA information indicating that the queued data packets arrived at the Bluetooth-enabled peripheral device within the time period, or may increase the burst period responsive to the TOA information indicating that at least some of the queued data packets arrived at the Bluetooth-enabled peripheral device after the time period.

In various implementations, the burst period may correspond to a Target TWT SP, and the burst interval may correspond to a TWT SI. The burst rate may correspond to an MCS rate or a PHY rate. In some implementations, the first and second data packets may carry latency-sensitive traffic, the burst period may correspond to an r-TWT SP, and the contention-based communication link may be one of P2P link, a TDLS link, a Wi-Fi Direct link, a link associated with a Group Owner (GO), or a link associated with a NAN. In some implementations, execution of the instructions may also be configured to determine the TWT SI based on a TSF value, to determine a codec starting time based on the determined TWT SI, and to determine a codec timestamp based on the determined codec starting time.

In some instances, execution of the instructions may also be configured to obtain initial values for each parameter of the set of parameters based on a type or class of traffic carried in the data packets. In other instances, execution of the instructions may also be configured to adjust a transmit power level at which to transmit the second data packets to the Bluetooth-enabled peripheral device based on the feedback information, and to update one or more TWT timing parameters based on the adjusted transmit power level. In some other instances, execution of the instructions may also be configured to select or change a power save mode or sleep state of the wireless device based on the feedback information.

Details of one or more implementations of the subject matter described in this disclosure are set forth in the accompanying drawings and the description herein. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
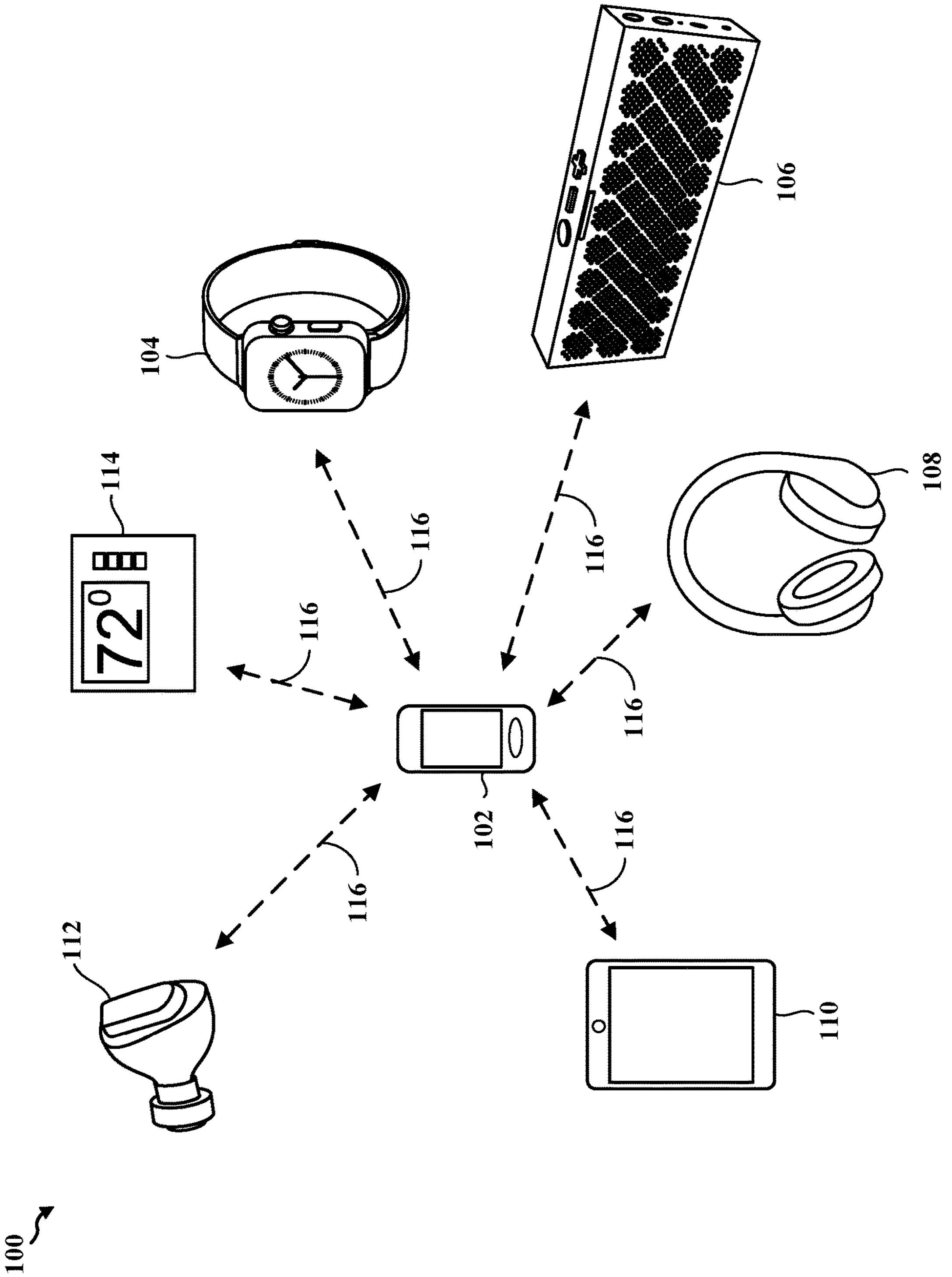
FIG. 1 shows a pictorial diagram of an example Wireless Personal Area Network (WPAN), according to various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Communications based on traditional Bluetooth and BLE suffer from several limitations that can limit user experiences and negatively affect user experiences. For example, the range of traditional Bluetooth and BLE is limited by a single hop radio frequency (RF) transmission. Additionally, traditional Bluetooth and BLE have limited data capacity, which can have several negative effects on user experience. For example, the limited data capacity of traditional Bluetooth and BLE can result in limited audio quality or a quality level unacceptable to the user. Further, traditional Bluetooth and BLE are enabled for radio frequency communication operating within the globally accepted 2.4 GHZ Industrial, Scientific & Medical (ISM) frequency band. However, Bluetooth and BLE devices that operate only within the 2.4 GHz frequency band may be subject to interference from other devices communicating with each other in the 2.4 GHZ frequency band (such as Wi-Fi devices).

To address these limitations, Bluetooth and BLE devices may be configured in accordance with various aspects of the subject matter disclosed herein to operate using a Bluetooth (BT) over Internet Protocol (BToIP) that allows Bluetooth and BLE data to be communicated over wireless networks that are based on, or that are at least compatible with, IP packets. For example, Bluetooth and BLE devices configured in accordance with the present disclosure can transmit and receive Bluetooth/BLE data over one or more channels associated with a wireless local area network (WLAN) by encapsulating Bluetooth/BLE data within packets formatted according to the IEEE 802.11 family of wireless communication standards. In this way, Bluetooth and BLE devices can communicate with one another in not only the 2.4 GHz frequency band, but also in the 5 GHz, the 6 GHz frequency band, and other suitable frequency bands.

In some other implementations, Bluetooth and BLE devices may be configured in accordance with various aspects of the subject matter disclosed herein to operate using a Bluetooth (BT) over WLAN (BToWLAN) protocol that allows WLAN-compliant data packets (such as IEEE 802.11-compliant PPDUs) to include encapsulated Ethernet frames carrying encoded Bluetooth data intended for one or more associated Bluetooth peripheral devices. The Ethernet frames may be of a new Ethertype indicating that the Ethernet frames carry Bluetooth-encoded data intended for one or more Bluetooth peripheral devices. The new Ethertype may also signal that the Ethernet frames are non IP-based Ethernet frames that do not need to pass through a TCP/IP stack prior to transmission to the one or more Bluetooth peripheral devices, thereby avoiding latencies associated with the TCP/IP stack.

However, communication over a wireless network such as a WLAN can result in higher power consumption than communicating via traditional Bluetooth and/or BLE protocols. The higher power consumption can negatively affect battery life of a Bluetooth-enabled device and require more frequent charging. Therefore, there exists a need for improved power management for devices communicating via the BToIP protocol.

FIG. 1 shows a pictorial diagram of an example Wireless Personal Area Network (WPAN) 100, according to some implementations. Within the WPAN 100, a central device 102 may connect to and establish a BLE communication link 116 with one or more peripheral devices 104, 106, 108, 110, 112, 114 using a BLE protocol or a modified BLE protocol. The BLE protocol is part of the BT core specification and enables radio frequency communication operating within the globally accepted 2.4 GHZ Industrial, Scientific & Medical (ISM) band.

The central device 102 may include suitable logic, circuitry, interfaces, processors, and/or code that may be used to communicate with one or more peripheral devices 104, 106, 108, 110, 112, or 114 using the BLE protocol or the modified BLE protocol as described herein. The central device 102 may operate as an initiator to request establishment of a link layer (LL) connection with an intended peripheral device 104, 106, 108, 110, 112, or 114. A Link Manager may be used to control operations between a BToIP application controller in the central device 102 and a BToIP application controller in each of the intended peripheral devices 104, 106, 108, 110, 112, and/or 114.

After a requested link layer connection is established, the central device 102 may become a host device, and the selected or intended peripheral device 104, 106, 108, 110, 112, or 114 may become paired with the central device 102 over the established link layer connection. As a host device, the central device 102 may be capable of supporting multiple link layer connections at a time with various peripheral devices 104, 106, 108, 110, 112, or 114 operating as client devices. Specifically, the central device 102 may manage various aspects of data packet communication in a link layer connection with one or more of the associated peripheral devices 104, 106, 108, 110, 112, or 114. For example, the central device 102 may determine an operation schedule in the link layer connection with one or more peripheral devices 104, 106, 108, 110, 112, or 114. The central device 102 may also initiate a link layer protocol data unit (PDU) exchange sequence over the link layer connection. Link layer connections may be configured to run periodic connection events in dedicated data channels. The exchange of link layer data PDU transmissions between the central device 102 and one or more of the peripheral devices 104, 106, 108, 110, 112, or 114 may take place within connection events.

In some implementations, the central device 102 may be configured to transmit the first link layer data PDU in each connection event to an intended peripheral device 104, 106, 108, 110, 112, or 114. In other implementations, the central device 102 may utilize a polling scheme to poll the intended peripheral device 104, 106, 108, 110, 112, or 114 for a link layer data PDU transmission during a connection event. The intended peripheral device 104, 106, 108, 110, 112, or 114 may transmit a link layer data PDU upon receipt of packet link layer data PDU from the central device 102. In some other implementations, a peripheral device 104, 106, 108, 110, 112, or 114 may transmit a link layer data PDU to the central device 102 without first receiving a link layer data PDU from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, or 114 may include a cellular phone, a smart phone, a SIP phone, a STA, a laptop, a PC, a desktop computer, a PDA, a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, or 114 in the WPAN 100, the central device 102 may communicate with more or fewer than six peripheral devices within the WPAN 100 without departing from the scope of the present disclosure.

A device implementing the BT protocol, such as the central device 102, may operate according to one radio mode, such as basic rate (BR)/enhanced data rate (EDR), and a device implementing the BLE protocol may operation according to a BLE radio mode. In some aspects, the central device 102 may be configured with dual radio modes, and therefore may be able to operate according to the BR/EDR mode or the BLE mode, for example, based on the type of short-rage wireless communication in which the device may engage.

For example, the central device 102 may operate according to the BR/EDR mode for continuous streaming of data, for broadcast networks, for mesh networks, and/or for some other applications in which a relatively higher data ratemay be more suitable. However, the device may operate according to the BLE mode for short burst data transmissions, such as for some other applications in which power conservation may be desirable and/or a relatively lower data rate may be acceptable. In other aspects, the central device 102 may operate according to one or more other radio modes, including proprietary radio mode(s). Examples of other radio modes may include high speedradio modes, low energy radio modes, isochronous radio modes, etc.

Figure 2:
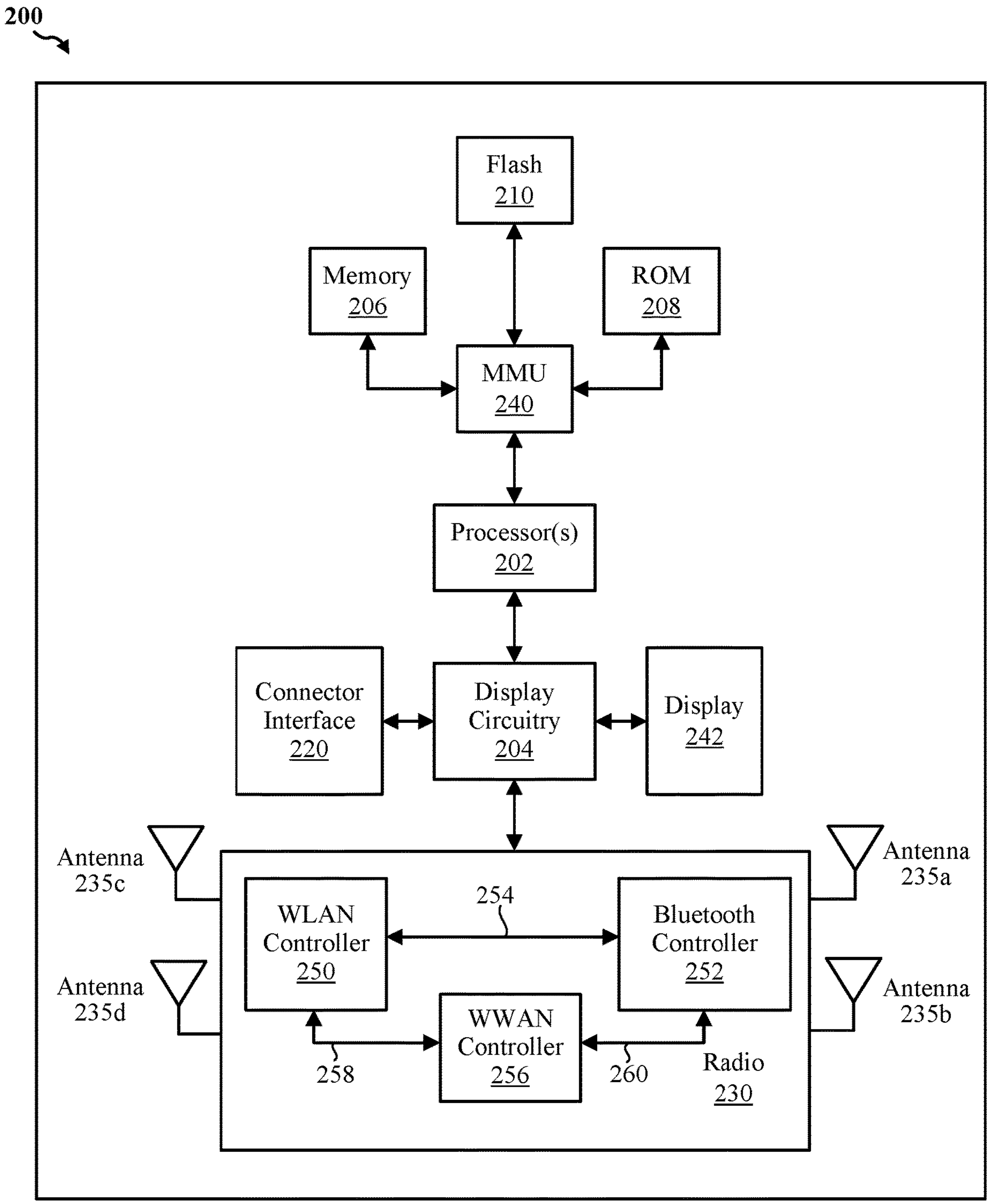
FIG. 2 shows a block diagram of a wireless device, according to various aspects of the present disclosure.

FIG. 2 shows a block diagram of a wireless device 200, according to some implementations. In some instances, the wireless device 200 may be an example of the central device 102 of FIG. 1. In other instances, the wireless device 200 may be an example of one or more of the peripheral devices 104, 106, 108, 110, 112, or 114 of FIG. 1. In some aspects, the wireless device 200 may be a Bluetooth-enabled device (such as a BLE device).

As shown, the wireless device 200 may include a processing element, such as processor(s) 202, which may execute program instructions for the wireless device 200. The wireless device 200 may also include display circuitry 204 that can perform graphics processing and present information to a user via the display 242. The processor(s) 202 may also be coupled to memory management unit (MMU) 240, which may be configured to receive addresses from the processor(s) 202 and translate the addresses to address locations in memory such as memory 206, ROM 208, or Flash memory 210) and/or to address locations in other circuits or devices, such as the display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless device 200. For example, the wireless device 200 may include various types of memory, a connector interface 220 through which the wireless device 200 can communicate with the computer system, and wireless communication subsystems that can transmit data to, and receive data from, other devices based on one or more wireless communication standards or protocols. For example, in some aspects, the wireless communication subsystems may include (but are not limited to) a WLAN subsystem, a Bluetooth subsystem, or a cellular subsystem (such as an LTE or 5G NR subsystem). The wireless device 200 may include a plurality of antennas 235*a*, 235*b*, 235*c*, or 235*d* for performing wireless communication with, for example, wireless devices in a WPAN.

The wireless device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an field programmable gate array (FPGA), and/or an application specific integrated circuit (ASIC).

In certain aspects, the radio 230 may include separate controllers configured to control communications for various respective radio access technology (RAT) protocols. For example, as shown in FIG. 2, radio 230 may include a WLAN controller 250 that manages WLAN communications, a Bluetooth controller 252 that manages Bluetooth and BLE, and a WWAN controller 256 that manages WWAN communications. In certain aspects, the wireless device 200 may store and execute a WLAN software driver for controlling WLAN operations performed by the WLAN controller 250, a Bluetooth software driver for controlling Bluetooth operations performed by the Bluetooth controller 252, and/or a WWAN software driver for controlling WWAN operations performed by the WWAN controller 256.

In certain implementations, a first coexistence interface 254 (such as a wired interface) may be used for sending information between the WLAN controller 250 and the Bluetooth controller 252. In certain other implementations, a second coexistence interface 258 may be used for sending information between the WLAN controller 250 and the WWAN controller 256. In certain other implementations, a third coexistence interface 260 may be used for sending information between the Bluetooth controller 252 and the WWAN controller 256.

In some aspects, one or more of the WLAN controller 250, the Bluetooth controller 252, and/or the WWAN controller 256 may be implemented as hardware, software, firmware or some combination thereof.

In certain configurations, the WLAN controller 250 may be configured to communicate with a second device in a WPAN using a WLAN link using all of the antennas 235*a*, 235*b*, 235*c*, and 235*d*. In certain other configurations, the Bluetooth controller 252 may be configured to communicate with at least one second device in a WPAN using one or more of the antennas 235*a*, 235*b*, 235*c*, and 235*d*. In certain other configurations, the WWAN controller 256 may be configured to communicate with a second device in a WPAN using all of the antennas 235*a*, 235*b*, 235*c*, and 235*d*. The WLAN controller 250, the Bluetooth controller 252, and/or the WWAN controller 256 may be configured to adjust wakeup time interval and shutdown time for the device.

Figure 3:
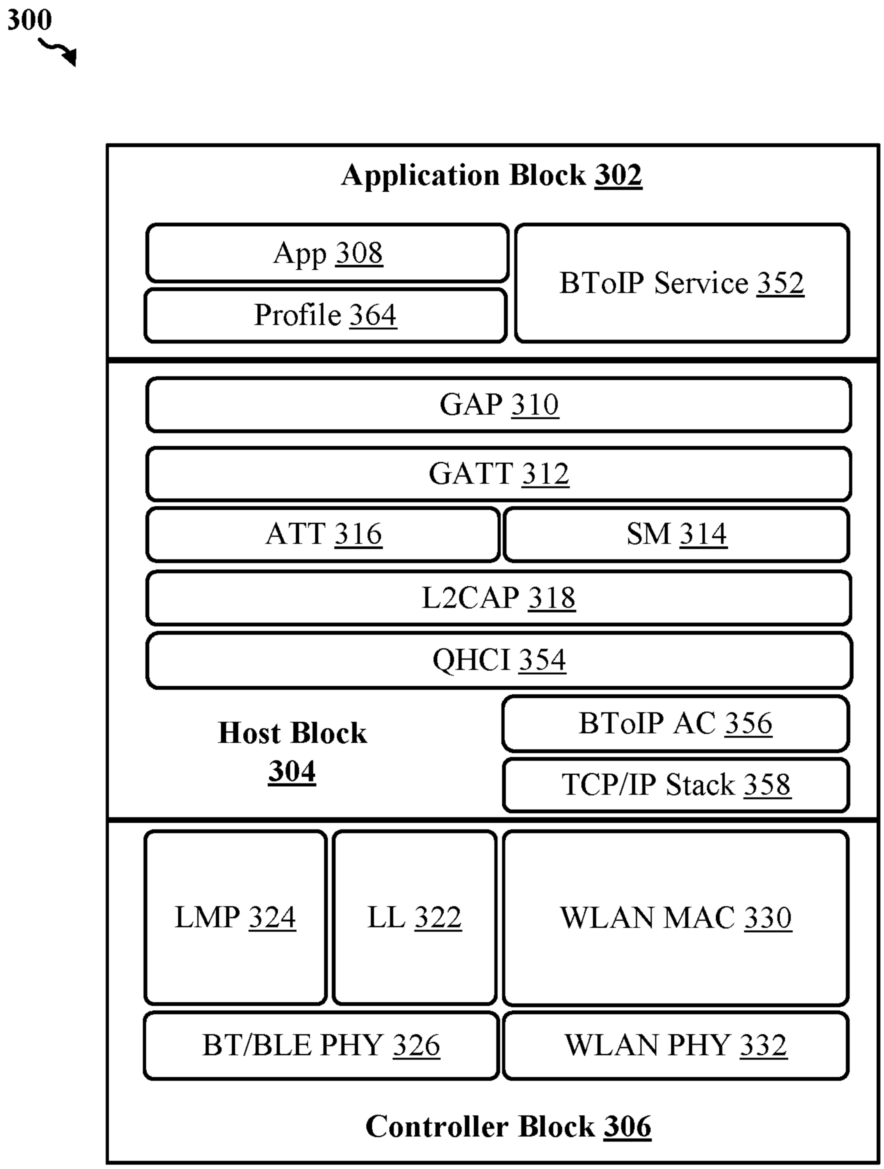
FIG. 3 shows a block diagram of a Bluetooth over Internet Protocol (BToIP) protocol stack, according to various aspects of the present disclosure.

FIG. 3 shows a block diagram of a BToIP protocol stack 300, according to some implementations. The BToIP protocol stack 300 may be implemented by one or more of processor(s) 202, memory 206, Flash memory 210, ROM 208, the radio 230, and/or the Bluetooth controller 252 described with reference to FIG. 2. In some implementations, the BToIP protocol stack 300 may be organized into three blocks, namely, the Application block 302, the Host block 304, and the Controller block 306. The Application block 302 may be a user application that interfaces with the other blocks and/or layers of the BToIP protocol stack 300. In some aspects, the Application block 302 may include one or more applications and one or more Bluetooth profiles that allow the applications to use the Bluetooth (BT) and BLE communications. The Host block 304 may include the upper layers of the BToIP protocol stack 300, and the Controller block 306 may include the lower layers of the BToIP protocol stack 300. The Host block 304 may communicate with a controller (such as the Bluetooth controller 252 of FIG. 2) in a wireless device using a Host Controller Interface (HCI) such as QHCI 354. The QHCI 354 may also be used as an interface between the Controller block 306 and the Host block 304 that allows a wide range of Hosts to interface with the Controller block 306. In some aspects, the Controller block 306 may be used for hardware interface management, link establishment, and link management.

The Application block 302 may include a higher-level Application Layer (App) 308, a Profile Layer (Profile) 364, and a BToIP Service layer 352. The Host block 304 may include a Generic Access Profile (GAP) 310, a Generic Attribute Protocol (GATT) 312, a Security Manager (SM) 314, an Attribute Protocol (ATT) 316, a Logical Link Control and Adaptation Protocol (L2CAP) 318, and the QHCI 354. In some aspects, the Host block 304 may also include a BToIP Application Controller (BToIP AC) 356 and a TCP/IP stack 358. The Controller block 306 may include a Link Layer (LL) 322, a Link Manager Protocol (LMP) 324, a BT/BLE Physical Layer (PHY) 326, a WLAN MAC 330, and a WLAN Physical Layer (WLAN PHY) 332.

To support IoT applications, audio applications, and other applications, the BT/BLE PHY 326 may be configured to support wider communication bandwidths and data rate than PHYs associated with conventional Bluetooth or BLE protocol stacks. For example, in some aspects, the BT/BLE PHY 326 may define the mechanism for transmitting a bit stream over a physical link that connects BLE devices. The bit stream may be grouped into code words or symbols, and converted to a PDU that is transmitted over a wireless medium. The BT/BLE PHY 326 may provide an electrical, mechanical, and procedural interface for the wireless medium. Specifically, the BT/BLE PHY 326 may specify the frequency band, the channel bandwidth, the modulation and coding scheme (MCS), the cyclic-shift diversity (CSD), and other physical aspects of wireless transmissions. The WLAN PHY 332 may define the mechanism for transmitting a bit stream over a physical WLAN link that connects two or more devices (such as WLAN devices). The BT/BLE PHY 326 and the WLAN PHY 330 may provide an electrical, mechanical, and procedural interface to the transmission medium. The shapes and properties of the electrical connectors, the frequency band used for transmission, the modulation scheme, and similar low-level parameters may be specified by the BT/BLE PHY 326 and WLAN PHY 330.

The LMP 324 may be responsible for low level communication over the BT/BLE PHY 326. The LMP 324 may manage the sequence and timing of transmitted and received link layer data PDUs, and using a link layer protocol, communicate with other devices regarding connection parameters and data flow control. In some aspects, the LMP 324 may provide gate keeping functionality to limit exposure and data exchange with other devices. In some implementations, the LMP 324 may maintain a list of allowed devices and ignore all requests for baseband PDU exchange from devices not on the list. The LMP 324 may use the QHCI 354 to communicate with upper layers of the BToIP protocol stack 300. In certain aspects, the LMP 324 may be used to generate a baseband PDU and/or an empty packet (such as an empty PDU) that may be transmitted using a LMP communication link established with another traditional BT device (such as a BR/EDR device) using the LMP 324.

The LL 322 may be responsible for low level communication over the BT/BLE PHY 326. The LL 322 may manage the sequence and timing of transmitted and received LL data PDUs, and using a LL protocol, communicate with other devices regarding connection parameters and data flow control. The LL 322 may provide gate keeping functionality to limit exposure and data exchange with other devices. If filtering is configured, the LL 322 may maintain a list of allowed devices and ignore all requests for data PDU exchange from devices not on the list. The LL 322 may use the QHCI 354 to communicate with upper layers of the BToIP protocol stack 300. In certain aspects, the LL 322 may be used to generate a LL data PDU and/or an empty packet (such as an empty PDU) that may be transmitted using a LL communication link established with another BLE device using the LL 322

The L2CAP 318 may encapsulate multiple protocols from the upper layers into a link layer data PDU and/or a QLL establishment PDU (and vice versa). The L2CAP 318 may also break large link layer data PDUs and/or a QLL establishment PDUs from the upper layers into segments that fit into a maximum payload size (such as 27 bytes) on the transmit side. Similarly, the L2CAP 318 may receive multiple link layer data PDUs and/or QLL establishment PDUs that have been segmented, and the L2CAP 318 may combine the segments into a single link layer data PDU and/or a QLL establishment PDU that may be sent to the upper layers.

The ATT 316 may be a client/server protocol based on attributes associated with a BLE device configured for a particular purpose (such as monitoring heart rate, monitoring temperature, broadcasting advertisements, etc.). The attributes may be discovered, read, and written by other BLE enabled devices. The set of operations which are executed over ATT 316 may include, but are not limited to, error handling, server configuration, find information, read operations, write operations, queued writes, etc. The ATT 316 may form the basis of data exchange between BLE devices.

The SM 314 may be responsible for device pairing and key distribution. A security manager protocol implemented by the SM 314 may define how communications with the SM of a counterpart BLE deice are performed. The SM 314 may provide additional cryptographic functions that may be used by other components of the modified BLE protocol stack 300. The architecture of the SM 314 used in BLE may be designed to minimize recourse requirements for peripheral devices by shifting work to a central device. The SM 314 provides a mechanism to not only encrypt the data but also to provide data authentication.

The GATT 312 describes a service framework using the attribute protocol for discovering services, and for reading and writing characteristic values on a counterpart BLE device. The GATT 312 interfaces with the App 308 through the App's profile. The App 308 profile defines the collection of attributes and any permission associated with the attributes to be used in BLE communications. One of the benefits of BT technology is device interoperability. To assure interoperability, using a standardized wireless protocol to transfer bytes of information may be inadequate, and hence, sharing data representation levels may be needed. In other words, BLE devices may send or receive data in the same format using the same data interpretation based on intended device functionality. The attribute profile used by the GATT 312 may act as a bridge between the modified BLE protocol stack and the application and functionality of the BLE device (at least from a wireless connection point of view), and is defined by the profile.

The GAP 310 may provide an interface for the App 308 to initiate, establish, and manage connection with counterpart BT/BLE devices. The profile layer 364 may include a set of BT/BLE profiles including, but not limited to, A2DP, AVRCP, HFP, and the like. The profiles of the profile layer 364 may operate over the L2CAP 318. The BToIP Service 352 may determine whether a peripheral device (such as one of the peripheral devices 104, 106, 108, 110, 112, or 114 of FIG. 1) supports BToIP protocol and/or is enabled to communicate via BToIP protocol. The BToIP Service 352 may be configured to exchange features (such as control point notifications) with the second device based on some triggers, events, and/or conditions detected or determined by the first device (such as via processor 202 of the first device). The exchanged features (such as the control point notifications) may indicate to the second device one or more actions the second device may perform.

The QHCI 354 may determine whether a Bluetooth packet is to be transmitted using a traditional Bluetooth protocol or using the BToIP protocol disclosed herein. The BToIP protocol bearer may be a software enabled access point (softAP) or an access point (AP). A BToIP protocol bearer may operate over multiple globally accepted ISM bands including, but not limited to, the 2.4 GHZ ISM band, the 5 GHZ ISM band, the 6 GHz ISM band, and the like. In some implementations, a WLAN radio of the device and/or the App layer 308 of the device may be configured to select one of the globally accepted ISM band over which the BToIP protocol bearer operates.

If the QHCI 354 determines that the Bluetooth packet and/or payload is to be transmitted via the BToIP protocol, then the QHCI 354 may route the Bluetooth packet and/or payload to the BToIP AC 356. In some aspects, the QHCI 354 may indicate to the BToIP AC 356 that the Bluetooth packet and/or payload is to be transmitted using the BToIP protocol.

The BToIP AC 356 may be configured to encapsulate data packets in a manner indicating that the data packets are to be transmitted over a WLAN channel or link using the BToIP protocol. For example, the BToIP AC 356 may add, to each data packet that is to be transmitted using the BToIP protocol, a header indicating that the respective data packet is formatted for transmission based on the BToIP protocol. The BToIP AC 356 may also be configured to decapsulate data packets received using the BToIP protocol, and forward the decapsulated data to other layers of the BToIP protocol stack 300. In some aspects, the BToIP AC 356 may decapsulate received BToIP packets by stripping the BToIP headers from the received BToIP packets and forwarding the decapsulated data to the other layers of the BToIP protocol stack 300.

The TCP/IP stack 358 may encapsulate BToIP packets with TCP/IP or TCP/UDP headers and forward the encapsulated BToIP packets to the WLAN MAC 330. The TCP/IP stack 358 may decapsulate packets received via the BToIP link and forward the decapsulated data to the other layers of the BToIP protocol stack 300. The WLAN PHY 332 may transmit BToIP packets to, and receive BToIP packets from, a peripheral device over a WLAN channel or link. In some aspects, the WLAN MAC 330 may be responsible for low level communication over the WLAN PHY 332.

Figure 4A:
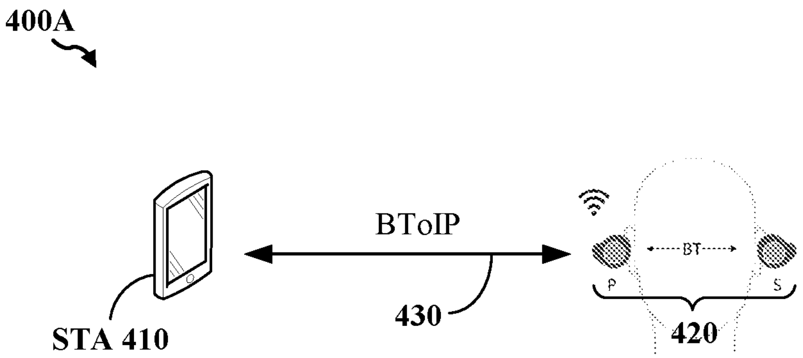
FIGS. 4A-4B show example topologies of a wireless network that supports wireless communications using the BToIP protocol disclosed herein.
Figure 4B:
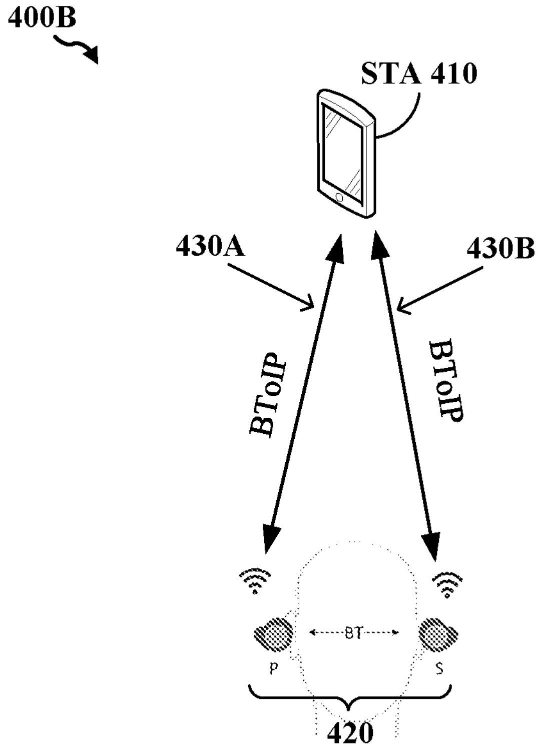

FIGS. 4A-4B show example topologies of wireless networks that support wireless communications using the BToIP disclosed herein. For example, FIG. 4A shows an example wireless network 400A that includes a STA 410 and a pair of earbuds 420 that may be paired with each other via a Bluetooth connection. In some implementations, the STA 410 may be one example of the central device 102 of FIG. 1, and the peripheral device 420 may be one example of the peripheral device 112 of FIG. 1. In various aspects, the STA 410 and earbuds 420 are also connected by a communication link 430 over which the STA 410 and the earbuds 420 may exchange data and other information with each other based on the BToIP disclosed herein. As discussed, the BToIP allows the STA 410 to transmit Bluetooth-encoded data (such as an audio stream or a video stream) to the earbuds 420 over the communication link 430) using frames or packets compliant with the IEEE 802.11 family of wireless communication standards.

The communication link 430 may be any suitable contention-based communication link that allows the STA 410 and the peripheral device 420 to communicate with each other using WLAN-compliant data packets. In some aspects, the communication link 430 may be a Wi-Fi link such as (but not limited to) a P2P link, a TDLS link, or a Wi-Fi Direct link. In some instances, the STA 410 may implement a softAP that operates on the same wireless channels as the STA 410, and the earbuds 420 may be associated with the softAP. In this way, the earbuds 420 may be associated with the softAP, which may allow the STA 410 to communicate directly with the earbuds 420 over the communication link 430 without tunneling through an access point (AP).

FIG. 4B shows an example wireless network 400B that includes the STA 410 and earbuds 420 described with reference to FIG. 4A. The wireless network 400B is similar to the wireless network 400A of FIG. 4A, except that the primary and secondary earbuds (P and S, respectively) in the example of FIG. 4B have direct communication links 430A and 430B, respectively, with the STA 410. In this example, the STA 410 may transmit a data stream to each of the primary earbud (P) and the secondary earbud(S) via respective communication links 430A and 430B, concurrently.

Figure 5A:
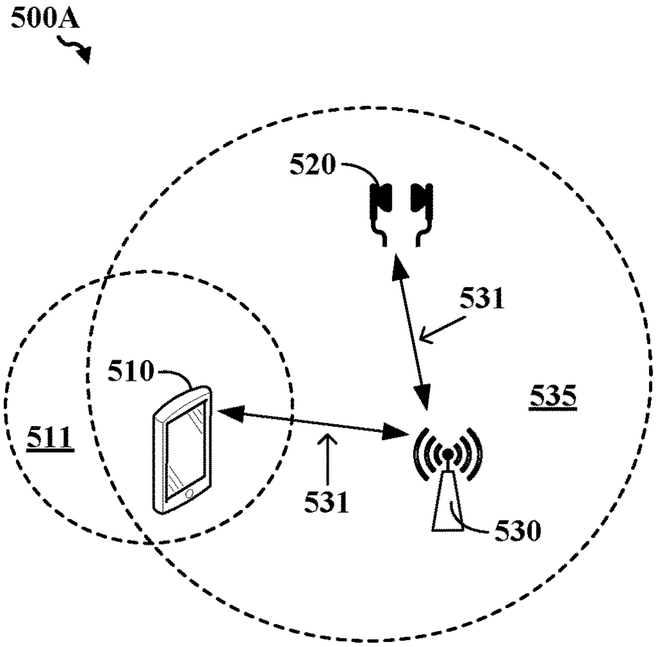
FIGS. 5A-5B show example topologies of other wireless networks that support wireless communications using the BToIP protocol disclosed herein.
Figure 5B:
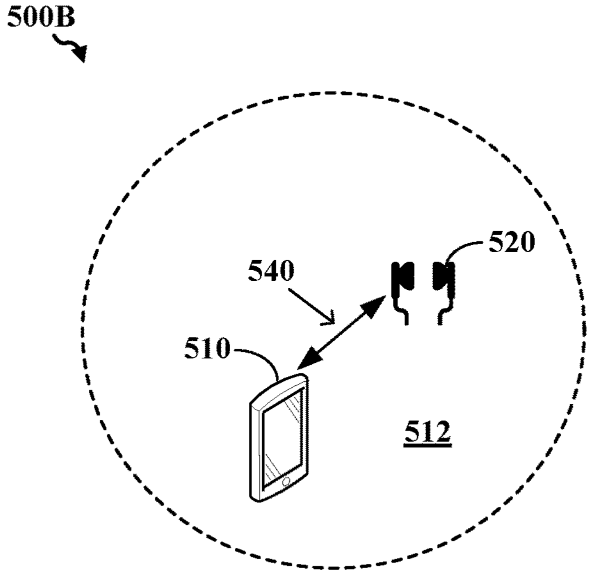

FIGS. 5A-5B show example topologies of other wireless networks 500A and 500B that support wireless communications using the BToIP disclosed herein. The wireless network 500A of FIG. 5A is shown to include a STA 510, a pair of earbuds 520 that may be paired with the STA 510 via a Bluetooth connection, and an AP 530. In some implementations, the STA 510 may be one example of the central device 102 of FIG. 1, and the earbuds 520 may be one example of the peripheral device 112 of FIG. 1. The AP 530 may operate a BSS on one or more wireless channels, and may provide a wireless coverage area 535 for WLAN communications over the one or more wireless channels. The STA 510 may be associated with the AP 530, and may receive data streams directly from the AP 530 over one or more WLAN channels 531. The STA 510 may also provide a wireless coverage area 511 for Bluetooth communications with the earbuds 520.

In the example of FIG. 5A, the earbuds 520 are located outside of the Bluetooth coverage area 511 provided by the STA 510, and therefore the STA 510 may not be able to transmit a data stream to the earbuds 520) via the Bluetooth connection. In various aspects, the earbuds 520 may also be associated with the AP 530. Specifically, the earbuds 530 may operate as a client device of the AP 530, and may receive data streams directly from the AP 530 over the one or more WLAN channels 531 based on the BToIP disclosed herein.

FIG. 5B shows an example wireless network 500B that includes the STA 510 and the earbuds 520 described with reference to FIG. 5A. In the example of FIG. 5B, the earbuds 520) are located within a wireless coverage area 512 provided by the STA 510. As such, the STA 510 and earbuds 520 may communicate with each other directly, without the presence of an AP, using a communication link 540. In various aspects, the communication link 540 allows the STA 510 and the earbuds 520 to exchange data and other information with each other based on the BToIP protocol disclosed herein. The communication link 540 may be any suitable contention-based communication link that allows the STA 510 and the peripheral device 520 to communicate with each other using WLAN-compliant data packets. In some aspects, the communication link 540 may be a Wi-Fi link such as (but not limited to) a P2P link, a TDLS link, or a Wi-Fi Direct link.

Figure 6:
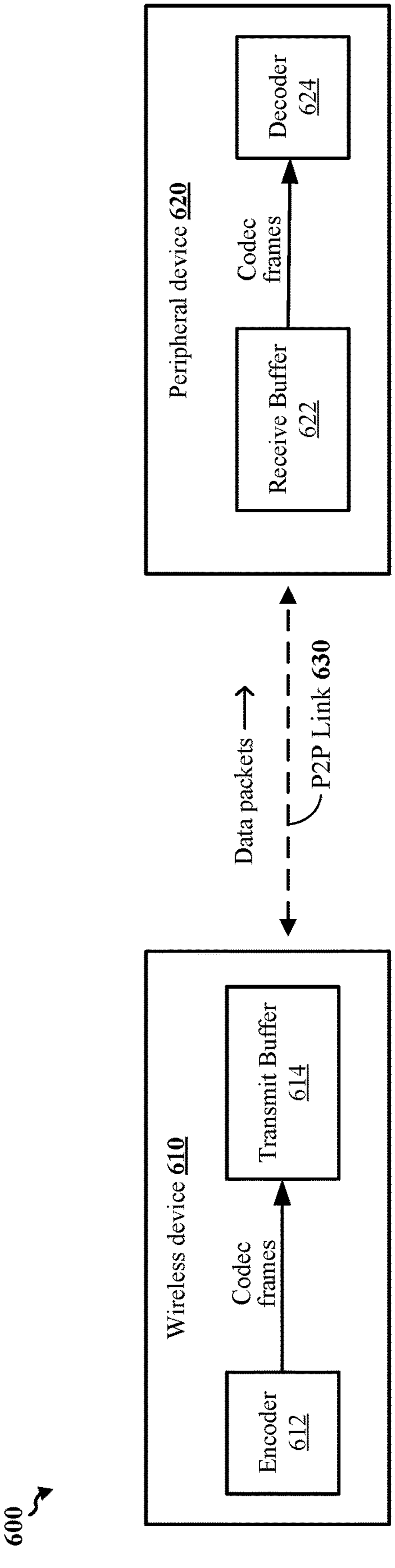
FIG. 6 depicts an example transmission of a data packet from a wireless device to a peripheral device, according to various aspects of the present disclosure.

FIG. 6 depicts an example transmission 600 of data packets from a wireless device 610 to a peripheral device 620 over a communication link 630, according to various aspects of the present disclosure. In some implementations, the wireless device 610 may be one example of the central device 102 of FIG. 1 or the wireless device 200 of FIG. 2, and the peripheral device 620 may be an example of one or more of the peripheral devices 104, 106, 108, 110, 112 or 114 of FIG. 1. In some instances, the peripheral device 720 may be a pair of earbuds such as the earbuds 420 of FIGS. 4A-4B or the earbuds 520 of FIGS. 5A-5B. The communication link 630 may be any suitable contention-based communication link such as (but not limited to) a wireless channel in the 2.4 GHz frequency band, the 5 GHz frequency band, the 6 GHz frequency band, or the 60 GHz frequency band. In some instances, the communication link 630 may be a P2P link, a TDLS link, or a Wi-Fi Direct link.

The wireless device 610 is shown to includer an encoder 612 and a transmit buffer 614. The encoder 612 may be configured to encode data, such as audio or video data, using a specified bitrate. The transmit buffer 614 may be configured to queue data packets that are to be transmitted over the communication link 630 to the peripheral device 620. In some implementations, the data packets to be transmitted over the communication link 630 may be of a predefined size, for example, based on the type of link 630 and/or channel conditions associated with the communication link 630. In some aspects, data encoded by the encoder 612 may be packetized into a data packet of a predefined size. The wireless device 610 may de-queue data packets from the transmit buffer 614 and transmit the data packets to the peripheral device 620 over the communication link 630.

The peripheral device 620 is shown to includer a receive buffer 622 and a decoder 624. Data packets received over the communication link 630 may be queued or otherwise stored in the receive buffer 622. The data packets may be output from the receive buffer 622 and forwarded to the decoder 624. In some aspects, the decoder 624 may decode data (such as audio and/or video data) carried in the payloads of the queued data packets, and forward the decoded data to upper layers of the protocol stack for processing and playback to a user.

In some implementations, the encoder 612 may encode a first encoder/decoder (codec) frame using a first bitrate, and forward the first codec frame to the transmit buffer 614 to be packetized for transmission to the peripheral device 620 over the communication link 630. For instances in which the first codec frame is too large to be packetized within a data packet of the predefined size, a first portion of the first codec frame that fits within a data packet may be de-queued from the transmit buffer 614 and transmitted over the communication link 630 to the peripheral device 620. A second portion of the first codec frame, which did not fit within the data packet transmitted to the peripheral device 620, may be transmitted to the peripheral device 620 in a subsequent data packet.

The peripheral device 620 may queue the received data packet in the receive buffer 622, and may forward the first portion of the first codec frame to the decoder 624 for decoding. In some instances, the decoder 624 may not be able to decode the first portion of the first codec frame without the second portion of the first codec frame. The resulting delay in decoding the first codec frame may cause "jitter" in the play back of audio and/or video data carried in the first codec frame, which may adversely impact user experience. In some instances, the delay in timely delivery of the first codec frame to the peripheral device 620 may be reduced by increasing the bitrate used to encode the data. In other instances, the delay in timely delivery of the first codec frame to the peripheral device 620 may be reduced by increasing the transmit power level used for transmitting data packets over the communication link 630 to the peripheral device 620.

Figure 7:
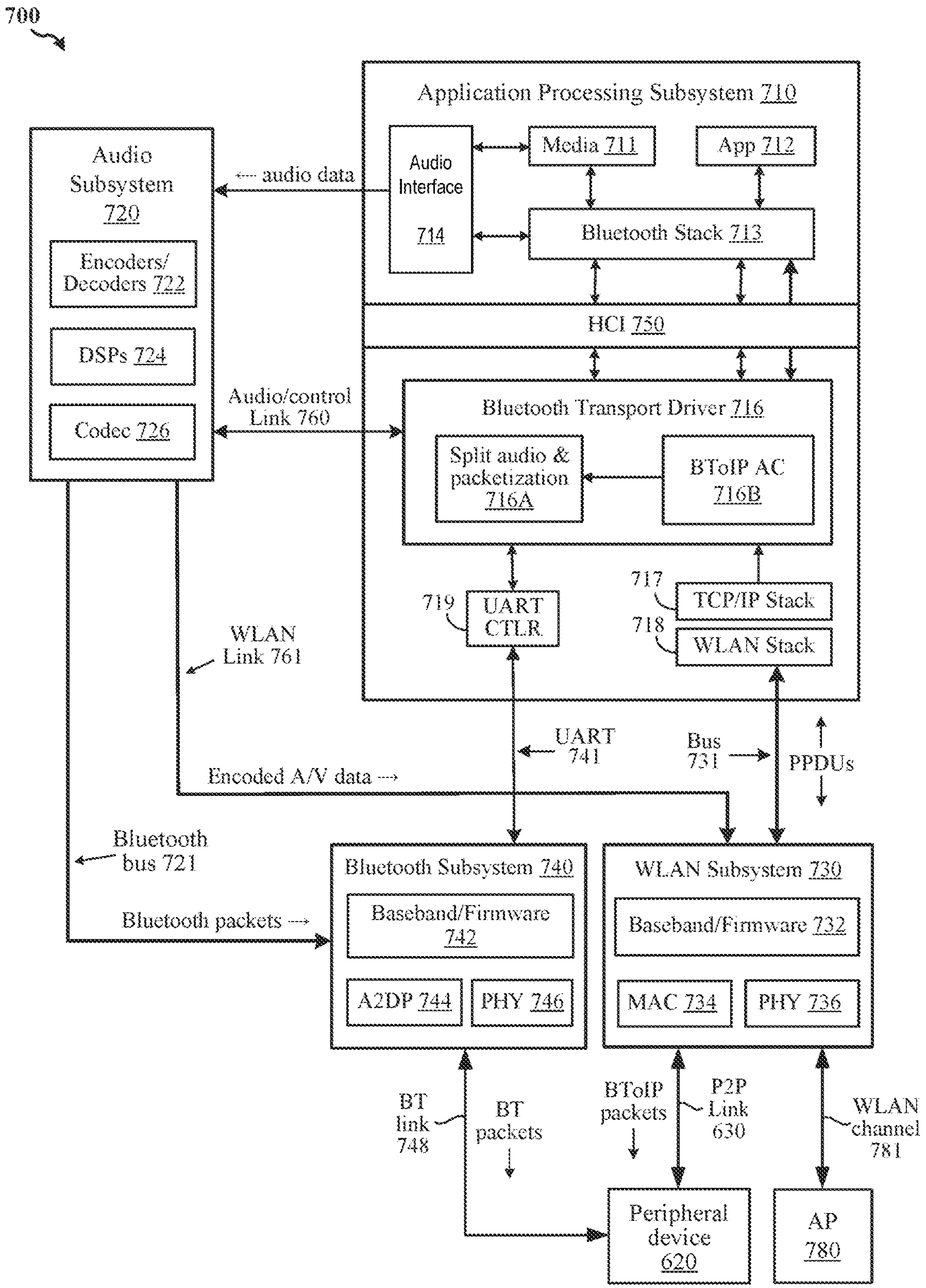
FIG. 7 shows a block diagram of another example wireless device, according to various aspects of the present disclosure.

FIG. 7 shows a block diagram of another example wireless device 700, according to various aspects of the present disclosure. In some implementations, the wireless device 700 may be an example of the central device 102 of FIG. 1, the wireless device 200 of FIG. 2, or the wireless device 610 of FIG. 6. In some instances, the wireless device 700 may operate as a STA that can transmit data to and receive data from an associated AP 780 over a wireless channel 781 of a WLAN, while also operating as a softAP that can transmit data to and receive data from the peripheral device 620 over a contention-based communication link (such as the P2P link 630) using the BToIP protocol disclosed herein. In some instances, the peripheral device 620 may be paired with the wireless device 700 based on the Bluetooth or BLE protocol. For example, in some aspects, the peripheral device 620 may be a pair of earbuds or headphones that can exchange Bluetooth-encoded data and other signals with the wireless device 700 over a Bluetooth link 748 using a Bluetooth or BLE protocol, and can also exchange Bluetooth-encoded data and other signals with the wireless device 700 over the P2P link 630 using the BToIP protocol disclosed herein.

The wireless device 700 may include an Application Processing subsystem 710, an audio subsystem 720, a WLAN subsystem 730, a Bluetooth subsystem 740, and a Host Controller Interface (HCI) 750. The Application Processing subsystem 710, which may correspond to at least some portions of the application layer and the Host block of the BToIP protocol stack 300 of FIG. 3, is shown to include a media player 711, an Application Layer (App) 712, a Bluetooth stack 713, and an audio interface 714. The media player 711 can be suitable device or component capable of generating or receiving multimedia content including, for example, real-time audio streams, real-time video streams, real-time gaming streams, and other latency-sensitive traffic. The App 712, which may be one implementation of the App 308 of FIG. 3, includes at least one Bluetooth profile that defines the collection of attributes and associated permissions to be used in Bluetooth or BLE communications. In some aspects, the App 712 may include processing resources including (but not limited to) the memory 206, the ROM

208, and the Flash memory 210 of FIG. 2. The Bluetooth stack 713 may be one implementation of the BToIP protocol stack 300 of FIG. 3.

The Bluetooth transport driver 716 may include a split audio and packetization module 716A and a BToIP AC 716B. The split audio and packetization module 716A may be responsible for packetizing data (such as audio and/or video data) into Bluetooth frames that can be transmitted to the peripheral device 620 using either a Bluetooth/BLE protocol or the BToIP protocol disclosed herein. The BToIP AC 716B, which may be one example of the BToIP AC 356 of FIG. 3, may be configured to encapsulate Bluetooth packets in a manner that indicates whether the Bluetooth packets are to be transmitted using the Bluetooth/BLE protocol or the BToIP protocol disclosed herein, as described with reference to FIG. 3. For example, the BToIP AC 716B may add headers to the Bluetooth packets indicating that the Bluetooth packets are to be transmitted to the peripheral device 620 using the BToIP protocol disclosed herein. The BToIP AC 716B may also be configured to decapsulate data packets received over the BToIP link and forward the decapsulated data to other layers of the Bluetooth stack 713. Further, although shown in the example of FIG. 7 as provided in the Host, in other implementations, the BToIP AC 716B may be provided within the WLAN subsystem 730.

The Bluetooth transport driver 716 is connected to the audio subsystem 720 via an audio and control link 760. In some instances, the audio and control link 760 may be used to send encoded audio/video data and control signals between the Bluetooth transport driver 716 and audio/video DSPs within the audio subsystem 720. The TCP/IP stack 717 allows the wireless device 700 to exchange data and control information with corresponding layers of a TCP/IP stack implemented in the peripheral device 620. For example, the TCP/IP stack 717 may be used to format frames or packets for transmission based on the TCP/IP transmission protocol, and may be used to extract data from frames or packets received based on the TCP/IP transmission protocol.

The WLAN stack 718 allows the wireless device 700 to exchange data and control information with corresponding layers of a WLAN stack implemented in the AP 780. For example, the WLAN stack 718 may be used to format frames or packets for transmission as IEEE 802.11-compliant PPDUs to the AP 780 over the WLAN channel 781, and may be used to extract data from IEEE 802.11-compliant PPDUs received from the AP 780 over the WLAN channel 781. In some instances, the WLAN stack 718, the TCP/IP stack 717, and the UART controller 719 may correspond to a Kernel space of the Application Processing subsystem 710. The UART 741, which is managed by the UART controller 719, provides a 3-wire interface (such as a transmit wire, a receive wire, and a ground wire) between the application processing subsystem 710 and the Bluetooth subsystem 730. A bus 731 provides a connection between the WLAN stack 718 and the WLAN subsystem 730. The bus 731 may be any suitable bus, signal line, or signaling that can be used to exchange PPDUs, control information, and other signals between the WLAN stack 718 and the WLAN subsystem 730. For example, in some aspects, the bus 731 may be a PCIe bus, soundwire, an Inter-IC Sound (12S) bus, and the like.

The audio subsystem 720 may include encoders/decoders 722, one or more digital signal processors (DSPs) 724, and one or more codecs 726. The encoders/decoders 722 may be used to sample audio/video data extracted from one or more PPDUs received over one or more wireless channels of a WLAN and processed in the Application Processing block 710 based at least in part on a Bluetooth profile. In some implementations, the encoders/decoders 722 may partition the sampled audio/video data into payloads that can be embedded within one or more Bluetooth packets for transmission to the peripheral device 620 over a Bluetooth or BLE connection. In some other implementations, the encoders/decoders 722 may partition the sampled audio/video data into Ethernet frames or packets that can be encapsulated within IEEE 802.11-compliant PPDUs for transmission to the peripheral device 620 over the P2P link 630. In some instances, the DSPs 724 and/or the codecs 726 may employ one or more encoding or decoding algorithms in conjunction with sampling the audio data.

The WLAN subsystem 730 may include a WLAN baseband circuit and firmware block 732, a MAC layer 734, and a PHY 736. The WLAN firmware may control operations of the WLAN subsystem 730, and may determine the protocol and configuration of one or both of the MAC layer 734 or the PHY 736. The WLAN baseband circuit may decode and/or process received data at baseband frequency, and may process and encode outgoing data at baseband frequency. The MAC layer 734 and the PHY 736 are collectively responsible for embedding outgoing data into MAC frames (such as MSDUs), encapsulating the MAC frames into data packets (such as PPDUs), and transmitting the data packets over the WLAN channel 781 to one or more other wireless devices. The MAC layer 734 and the PHY 736 are also collectively responsible for receiving data packets (such as PPDUs) over the WLAN channel 781, extracting data from the MAC frames encapsulated in the received data packets, and decoding the extracted data.

Specifically, when the WLAN subsystem 730 is in a receive mode, the PHY 736 may be used to receive, demodulate, and down-convert PPDUs received over the wireless channel 781, and the MAC layer 734 may be used to decode data encapsulated in the received PPDUs. The MAC layer 734 may also forward the decoded data to the application layer via the HCI 750. When the WLAN subsystem 730 is in a transmit mode, the MAC layer 734 may be used to construct and format MAC frames to carry data provided by the upper layers, and the PHY 736 may encapsulate the MAC frames within one or more PPDUs for transmission over the WLAN channel 781. In some aspects, the PHY 736 may define the mechanism for transmitting A/V bitstreams to the peripheral device 620 over the P2P link 630) based on the BToIP protocol disclosed herein.

The Bluetooth subsystem 740 may include a Bluetooth baseband circuit and firmware block 742, an advanced audio distribution profile (A2DP) circuit 744, and a PHY 746. The Bluetooth baseband circuit and firmware block 742 may be used to generate baseband signals for constructing and deconstructing data frames based on the Bluetooth or BLE protocol. The Bluetooth baseband circuit and firmware block 742 may also be used to generate carrier signals for up-converting baseband signals during data transmissions and for down-converting received data signals to baseband. The A2DP circuit 744 may be used to control or manage an A2DP link between the wireless device 700 and the peripheral device 620. Specifically, when the Bluetooth subsystem 740 is in a receive mode, the PHY 746 can be used to receive, demodulate, and down-convert data packets received over the Bluetooth link or connection 748, and to forward the data packets to the application processing subsystem 710. When the Bluetooth subsystem 740 is in a transmit mode, the PHY 746 can be used to encapsulate data provided from the upper layers into one or more Bluetooth frames or packets for transmission to the peripheral device 620 over the Bluetooth link or connection 748.

In various aspects, the wireless device 700 may include a WLAN link 761 connected between the audio subsystem 720 and the WLAN subsystem 730. The WLAN link 761 may provide a direct link or channel over which Bluetooth-encoded audio/video data can be sent from the audio subsystem 720 to the WLAN subsystem 730 without passing through or accessing the Application Processing subsystem 710. Specifically, the WLAN link 761 may allow Bluetooth-encoded data to be forwarded directly from the audio subsystem 720 to the WLAN subsystem 730 for transmission to the peripheral device 620 over the P2P link 630 without consuming processing cycles of the application processor, thereby avoiding latencies associated with the application processor and also avoiding latencies associated with the TCP/IP stack 717. In this way, the WLAN link 761 can reduce jitter and latency by directly routing Bluetooth-encoded data from the audio subsystem 720 to the WLAN subsystem 730.

In various implementations, the wireless device 700 may be configured to dynamically adjust a set of transmission parameters associated with transmitting a data stream to the peripheral device 620 over the P2P link 630 (or some other suitable contention-based communication link). The data stream may include a plurality of Bluetooth-encoded data packets encapsulated within a number of IEEE 802.11-compliant PPDUs. In some aspects, each data packet transmitted to the peripheral device 620 may include a time-to-play (TTP) value indicating a playback time for audio or video data carried in the respective data packet. In some instances, the playback time indicated by a respective TTP value may be referenced to a Timing Synchronization Function (TSF) value of the wireless device 700. In this way, the wireless device 700 may coordinate transmission of the data stream over the P2P link 630 with the play back of audio or video information carried in the data stream to the user.

In some implementations, the set of transmission parameters may include one or more of a burst rate, a burst interval, a burst period, or a transmit power level. In some instances, the set of transmission parameters may also include a TTP value. For example, the burst rate may indicate an MCS rate or other bitrate used to encode Bluetooth audio and/or video data into data packets for transmission to the peripheral device 620) as a data stream. The burst period may indicate a duration of time during which a "burst" of the data stream is transmitted to the peripheral device 620 over the P2P link 630. The burst interval may indicate a time period between successive data bursts during which the wireless device 700 may enter a low-power state or sleep state to reduce power consumption. The transmit power level may indicate a power level at which the data burst is transmitted to the peripheral device 620 over the P2P link 630. The TTP value may indicate a playback time at which the peripheral device 620 is to output received audio or video data to the user.

In some instances, the wireless device 700 may transmit the data stream to the peripheral device 620 using a Target Wake Time (TWT) operation specified by the 802.11ax, 802.11be, and later amendments to the IEEE 802.11 family of wireless communication standards. In other instances, the wireless device 700 may transmit the data stream to the peripheral device 620 using a restricted-TWT (r-TWT) operation specified by the 802.11be and later amendments to the IEEE 802.11 family of wireless communication standards. The restricted TWT operation allows the AP 780 to establish one or more r-TWT service periods (SPs) that can be used to provide more predictable latency, reduced worst case latency, reduced jitter, and higher reliability for latency-sensitive traffic. For example, all STAs that support restricted TWT operation (referred to herein as "non-legacy STAs") that are TXOP holders outside of any r-TWT SP for which they are not a member to end their respective TXOPs before the start of the r-TWT SP. In some aspects, membership in a r-TWT SP may be reserved exclusively for STAs associated with latency-sensitive traffic (referred to herein as "low-latency STAs"). When the wireless device 700 transmits data streams to the peripheral device 620 using the TWT operation or restricted TWT operation, the burst rate parameter may correspond to the MCS or bitrate used to encode data transmitted during the TWT SP, the burst interval parameter may correspond to the TWT Service Interval (TWT SI), and the burst period parameter may correspond to a duration or time period of the TWT SP.

In some instances, the set of transmission parameters may be set to initial values based at least in part on the type of latency-sensitive traffic to be transmitted to the peripheral device 620. For example, Table 1 shows initial values for some transmission parameters when using the TWT operation to transmit gaming traffic, streaming lossless data, streaming music, and voice traffic to the peripheral device 620.

TABLE 1

| Traffic Type | TWT SI (ms) | TWT SP_1 (ms) | TWT SP_2 (ms) | Data Rate |
|---|---|---|---|---|
| Gaming | 4 | 1 | 32 | 200 kbps |
| Streaming Lossless | 100 | 15 | 260 | 2.3 Mbps |
| Streaming Music | 150 | 3 | 310 | 500 kbps |
| Voice | 40 | 1 | 60 | 64 kbps |

After transmitting a first data burst to the peripheral device 620 using the initial values of the transmission parameters, the wireless device 700 may dynamically adjust the set of transmission parameters based at least in part on channel conditions of the link 630 between the wireless device 700 and the peripheral device 620. In some implementations, the channel conditions of the link 630 may be estimated or determined based at least in part on buffer status information and timing information provided by the peripheral device 620. For example, referring also to FIG. 6, the buffer status information may include the quantity of data packets queued in the receive buffer 622, the rate at which the data packets are received or queued in the receive buffer 622, or both. The timing information may include the TTP values of the data packets queued in the receive buffer 622, the TOAs of the data packets queued in the receive buffer 622, or both.

In other implementations, the wireless device 700 may also select or change its power save mode or sleep state based on the channel conditions. In some instances, when the channel conditions are relatively good, the wireless device 700 may increase a level or depth of its power save mode or sleep state. For example, the wireless device 700 may transition from a light sleep mode to a deep sleep mode when the channel conditions are greater than a certain level (as long as a sleep interval is long enough to allow the wireless device 700 to wake up from the deep sleep mode). Conversely, when the channel conditions are relatively poor, the wireless device 700 may decrease the level or depth of its power save mode or sleep state. For example, the wireless device 700 may transition from the deep sleep mode to the light sleep mode when the channel conditions are less than the certain level.

In various aspects, one of the DSPs 724 (such as an audio DSP) may determine the initial TTP values of a data burst, and may determine a codec starting time based on the current TSF value and the burst interval offset (or the TWT SI offset). The current TSF value and burst interval offset (or TWT SI offset) may be obtained from WLAN firmware registers. The codec starting time may be used to determine a codec timestamp for the initial frame of the data burst to be encoded (such as by the audio codec 726). In some instances, the peripheral device 620 may estimate the TOAs of data packets received at both the right earbud and the left earbud and compare the estimated TOAs with a number of corresponding TTP target values to determine whether the data packets are delivered to the earbuds within an expected time period. The results of the comparison may be used to determine whether (and by how much) to adjust the set of transmission parameters.

The peripheral device 620 may transmit the buffer status information and/or the timing information of the received data burst to the wireless device 700 as feedback information carried in a buffer status report (BSR) over the link 630. In some instances, the peripheral device 620 may transmit the BSR or the feedback information to the wireless device 700 periodically (such as every N ms, where N is greater than 1). In other instances, the peripheral device 620 may transmit the BSR or the feedback information to the wireless device 700 in response to an event or a condition. In some other instances, the peripheral device 620 may transmit the BSR or the feedback information to the wireless device 700 in response to receiving a polling frame (such as a PS-Poll frame) from the wireless device 700.

The wireless device 700 may use the feedback information carried in the BSR to dynamically adjust the set of transmission parameters in a manner which ensures that latency requirements associated with the data stream are satisfied while minimizing power consumption. In some implementations, when the link 630 has a relatively high channel quality such that transmission of the data burst to the peripheral device 620 over the link 630 meets the latency requirements, the transmission parameters may be adjusted to reduce power consumption while continuing to meet the latency requirements. For example, when transmission of the data burst meets the latency requirements, the transmit power level may be decreased by an amount that reduces power consumption without increasing transmission latencies to an extent that would violate the latency requirements. In some instances, the transmit power level may be reduced until the signal-to-noise ratio (SNR) or the signal-to-interference plus noise ratio (SINR) of the data burst received at the peripheral device 620 reaches a value below which the signal strength of the data burst is insufficient to satisfy the latency requirements. In some aspects, the wireless device 700 may also decrease the burst rate (or encoding rate) and/or decrease the burst period associated with the data burst to reduce power consumption.

Conversely, when the link 630 has a relatively low channel quality such that transmission of the data burst to the peripheral device 620 over the link 630 fails to meet the latency requirements, the transmission parameters may be adjusted to reduce latencies associated with the link 630 while minimizing any corresponding increase in power consumption. In some instances, latencies associated with the link 630 may be reduced by increasing the burst period and/or decreasing the burst interval associated with the data burst, for example, so that the data stream is transmitted to the peripheral device 620 for longer durations that are separated by shorter quiet or sleep intervals. Thus, during TWT operation, the latencies may be reduced by increasing the TWT SP and/or decreasing the TWT SI so that each service period is longer and the sleep intervals are shorter.

In some instances, latencies associated with the link 630 may also be reduced by increasing the transmit power level until the SNR or SINR of the data burst received at the peripheral device 620 reaches a value at which the latency requirements are satisfied. The burst rate (or encoding rate) may also be increased to reduce latencies associated with the link 630.

Referring also to FIG. 6, some example indications that the channel quality of the link 630 is relatively high include the quantity of data packets queued in the receive buffer 622 exceeding a quantity threshold value, the rate at which the data packets are queued in the receive buffer 622 exceeding a rate threshold, and the TOAs of the data packets queued in the receive buffer 622 falling within a specified time period. Conversely, some example indications that the channel quality of the link 630 is relatively low include the quantity of data packets queued in the receive buffer 622 being less than the quantity threshold, the rate at which the data packets are queued in the receive buffer 622 being less than the rate threshold, and the TOAs of more than a certain number of the data packets queued in the receive buffer 622 falling outside the specified time period.

For example, if all of the data packets associated with a data burst are received by the peripheral device 620 within the specified time period (which may correspond to an expected delivery time of the data burst), then the data burst should meet the latency requirements. Conversely, if more than a certain number of the data packets associated with the data burst are not received by the peripheral device 620 within the specified time period (thereby indicating that at least some of the data packets were not delivered to the peripheral device 620 within the expected delivery time), then the data burst may violate the latency requirements. In this case, one or more of the transmission parameters may be adjusted to increase the speed with which the data burst is transmitted to the peripheral device 620.

In other implementations, the channel conditions or channel quality of the link 630 may be estimated or determined based on received signal strength indicator (RSSI) values of data packets received at the peripheral device 620, on a Channel Quality Indicator (CQI) for the link 630, or both. In some aspects, the set of transmission parameters may be adjusted in response to both the estimated channel conditions of the link 630 and the feedback information carried in the BSR. In this way, the wireless device 700 may ensure that the latency and throughout requirements of the data stream are met while power consumption associated with transmitting the data stream to the peripheral device 620 is minimized.

Figure 8:
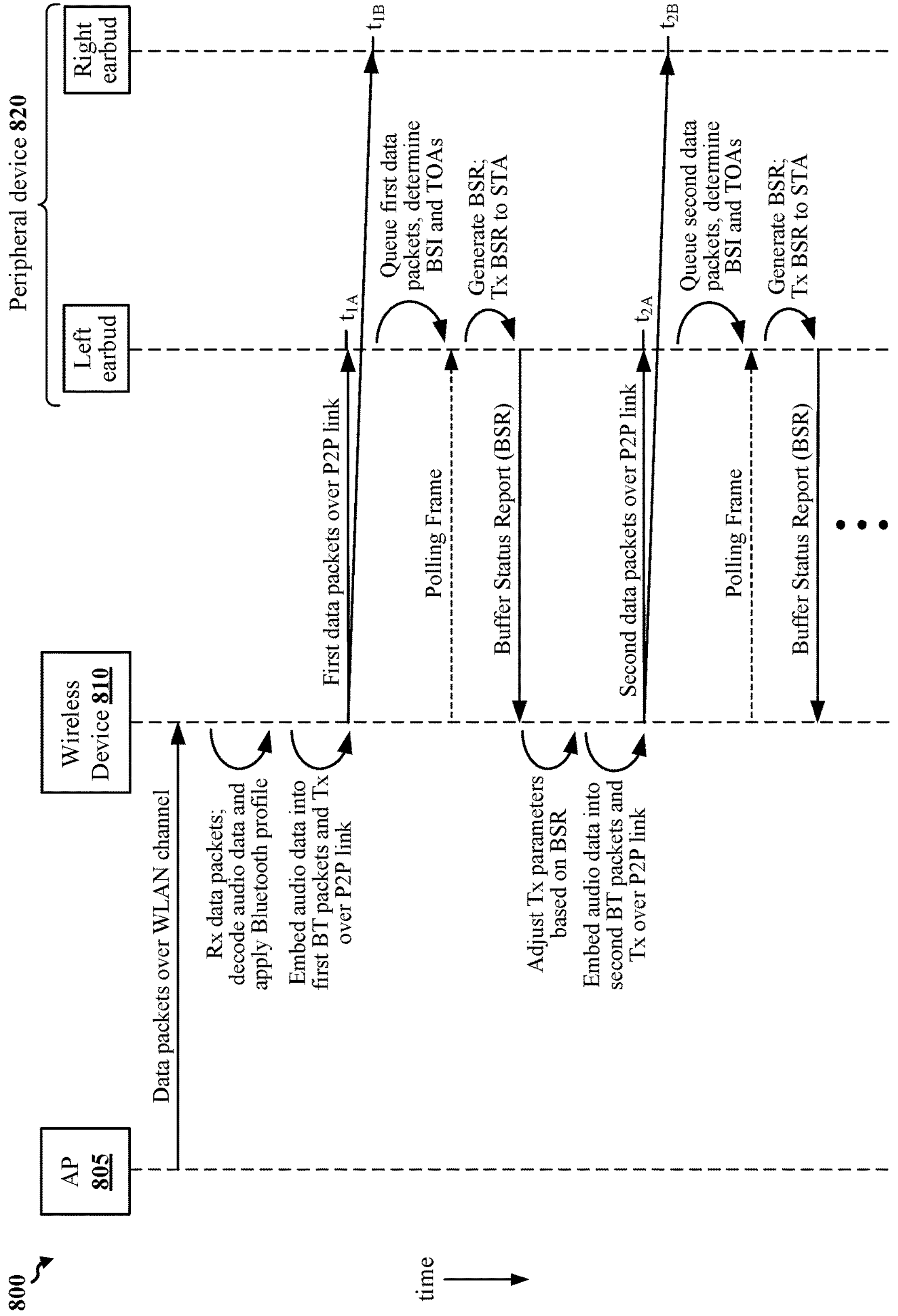
FIG. 8 shows a sequence diagram depicting an example wireless communication that supports streaming Bluetooth data to a peripheral device over a contention-based communication link, according to various aspects of the present disclosure.

FIG. 8 shows a sequence diagram depicting an example wireless communication 800 that supports streaming Bluetooth-encoded audio or video data to a peripheral device over a contention-based communication link, according to some implementations. The wireless communication 800 may be performed between an AP 805, a wireless device 810, and a peripheral device 820. The AP 805 may be any suitable access point or access terminal that can operate a basic service set (BSS) on a wireless medium. The wireless device 810 may be an example of the central device 102 of FIG. 1, the wireless device 200 of FIG. 2, the wireless device 610 of FIG. 6, or the wireless device 700 of FIG. 7. In some instances, the wireless device 810 may operate as a STA that can transmit data to and receive data from the AP 805 while also operating as a softAP that can transmit data to and receive data from the peripheral device 820.

The peripheral device 820, which may be paired with the wireless device 810 (or the softAP operated by the wireless device 810), may be an example of one or more of the peripheral devices 104, 106, 108, 110, 112, or 114 described with reference to FIG. 1, or the peripheral device 620 described with reference to FIGS. 6 and 7. In the example of FIG. 8, the peripheral device 820 is a pair of earbuds that includes a left earbud and a right earbud. The left earbud may be closer to the wireless device 810 than the right earbud, and therefore data packets transmitted by the wireless device 810 may arrive at the left earbud before arriving at the right earbud. The wireless communications 800 are described below in the context of streaming audio data to the peripheral device 820 over a Wi-Fi or WLAN link. In other implementations, the wireless communications 800 may carry other types and/or classes of data.

The AP 805 transmits data packets over a wireless channel of the BSS to wireless device 810. The data packets may carry audio data associated with streaming audio. The wireless device 810 receives the data packets, decodes the audio data, and applies one or more Bluetooth profiles to the decoded audio data. The wireless device 810 embeds a first portion of the audio data into a first group of Bluetooth packets, and encapsulates the first group of Bluetooth packets into IEEE 802.11-compliant data packets (such as PPDUs). The wireless device 810 determines or obtains initial values for a set of transmission parameters, and also determines or obtains an initial TTP value. The wireless device 810 transmits the first data packets to the peripheral device 820 over the P2P link as a first data burst using the initial values of the transmission parameters. As discussed, the transmission parameters may include one or more of a burst rate, a burst interval, a burst period, or a transmit power level.

The peripheral device 820 receives the first data packets associated with the first data burst, and queues the first data packets into a receive buffer (such as the receive buffer 622 of FIG. 6). The peripheral device 820 may determine buffer status information and timing information associated with reception of the first data packets. As discussed, the buffer status information may include the number of first data packets queued in the receive buffer, the rate at which the first data packets are received or queued in the receive buffer, or both. The timing information may include the TTP values of the first data packets queued in the receive buffer, the TOAs of the first data packets queued in the receive buffer, or both. In the example of FIG. 8, the left earbud is closer to the wireless device 810 than the right earbud, and thus the first data packets arrive at the left earbud (at time $t_{1A}$) before arriving at the right earbud (at time $t_{1B}$). As such, the TOAs of the first data packets at the left may be different than the TOAs of the first data packets at the right earbud.

The peripheral device 820 generates a buffer status report (BSR) carrying feedback information indicating the determined buffer status information and/or the timing information, and transmits the BSR to the wireless device 810 over the P2P link. In some instances, the peripheral device 820 may send a BSR carrying updated buffer status information and the timing information to the wireless device 810 periodically (such as every N ms, where N is greater than zero). In other instances, the peripheral device 820 may send a BSR carrying updated buffer status information and the timing information to the wireless device 810 based on an event or condition (such as the buffer status information changing by certain amounts or reaching certain thresholds). In some other instances, the peripheral device 820 may send a BSR carrying updated buffer status information and the timing information to the wireless device 810 in response to receiving a polling frame from the wireless device 810.

The wireless device 810 receives the BSR from the peripheral device 810, and may dynamically adjust the set of transmission parameters based at least in part on the feedback information carried in the BSR. As discussed with reference to FIGS. 6 and 7, when the feedback information indicates that the channel quality of the P2P link is relatively high (such that transmission of the first data burst meets any associated latency requirements), the wireless device 810 may adjust the transmission parameters in a manner that reduces power consumption while continuing to meet the latency requirements. Conversely, when the feedback information indicates that the channel quality of the P2P link is relatively low (such that transmission of the first data burst violates the latency requirements), the wireless device 810 may adjust the transmission parameters in a manner that reduces latencies associated with the P2P link while minimizing any associated increase in power consumption.

In other implementations, the wireless device 810 may also select or change its power save mode or sleep state based on the feedback information. In some instances, when the feedback information indicates that the channel quality of the P2P link is relatively high, the wireless device 810 may increase a level or depth of its power save mode or sleep state. For example, the wireless device 810 may transition from a light sleep mode to a deep sleep mode when the burst interval is greater than a threshold value (which may be selected based on the time associated with waking up from the deep sleep mode). Conversely, when the feedback information indicates that the channel quality of the P2P link is relatively low, the wireless device 810 may decrease the level or depth of its power save mode or sleep state. For example, the wireless device 810 may transition from the deep sleep mode to the light sleep mode when the burst interval is less than threshold value.

The wireless device 810 embeds a second portion of the audio data into a second group of Bluetooth packets, and encapsulates the second group of Bluetooth packets into IEEE 802.11-compliant data packets (such as PPDUs). The wireless device 810 determines or obtains an updated TTP value, and transmits the second data packets to the peripheral device 820 over the P2P link as a second data burst using the adjusted values of the transmission parameters.

The peripheral device 820 receives the second data packets associated with the second data burst, and queues the second data packets into a receive buffer. The peripheral device 820 may determine buffer status information and timing information associated with reception of the second data packets. The buffer status information may include the number of second data packets queued in the receive buffer, the rate at which the second data packets are received or queued in the receive buffer, or both. The timing information may include the TTP values of the second data packets queued in the receive buffer, the TOAs of the second data packets queued in the receive buffer, or both. The second data packets arrive at the left earbud (at time $t_{2A}$) before arriving at the right earbud (at time $t_{2B}$). As such, the TOAs of the second data packets at the left may be different than the TOAs of the second data packets at the right earbud.

The peripheral device 820 generates a BSR carrying feedback information indicating the determined buffer status information and timing information, and transmits the BSR to the wireless device 810 over the P2P link. In some instances, the peripheral device 820 may send the BSR to the wireless device 810 periodically (such as every N ms). In other instances, the peripheral device 820 may send the BSR to the wireless device 810 based on an event or condition (such as the buffer status information changing by certain amounts or reaching certain thresholds). In some other instances, the peripheral device 820 may send the BSR to the wireless device 810 in response to receiving a polling frame from the wireless device 810. This process may continue until all data packets associated with the streaming audio are delivered to the peripheral device 820.

Figure 9:
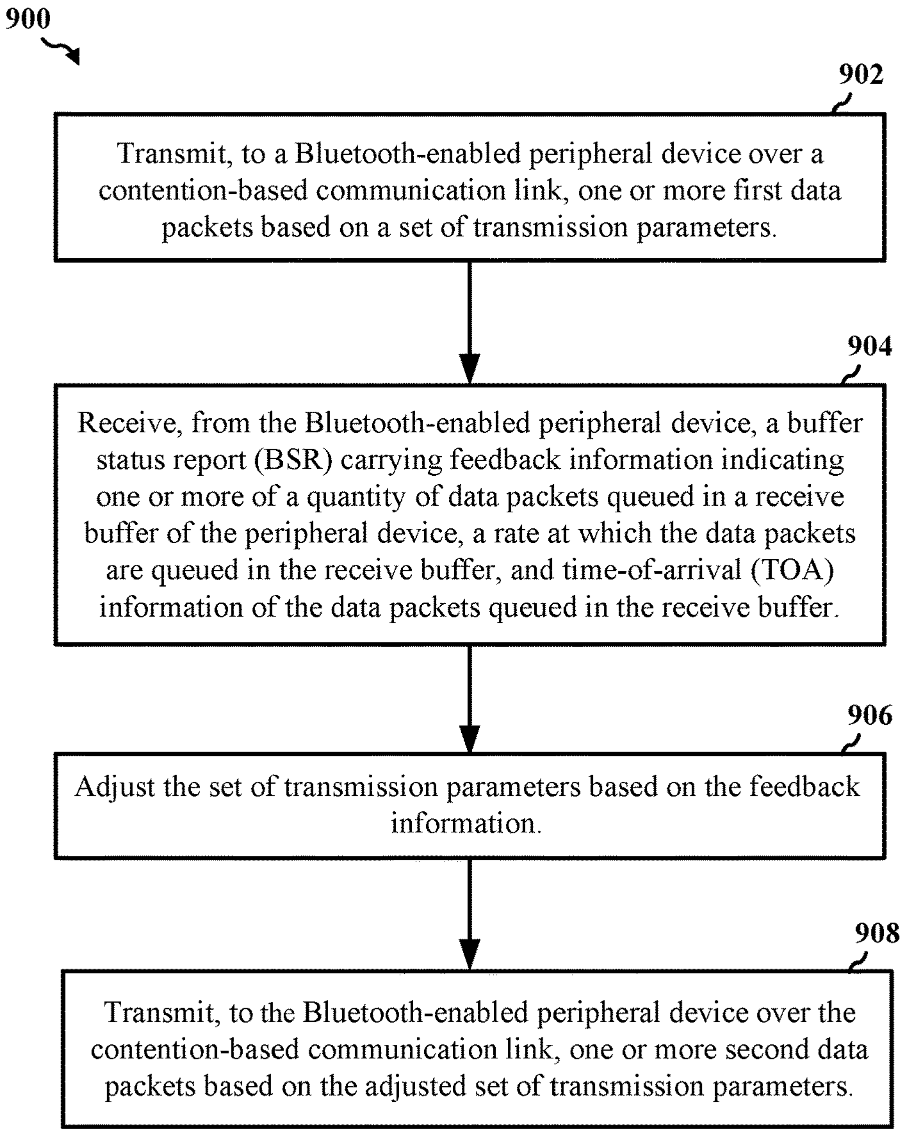
FIGS. 9-20 show flowcharts illustrating example operations for wireless communications that support streaming Bluetooth data to a peripheral device over a contention-based communication link, according to various aspects of the present disclosure.

FIG. 9 shows a flowchart illustrating an example operation 900 for wireless communication that supports streaming Bluetooth data to a peripheral device over a contention-based communication link, according to various aspects of the present disclosure. The operation 900 may be performed by a wireless device such as the central device 102 of FIG. 1, the wireless device 200 of FIG. 2, or the wireless device 700 of FIG. 7. In some implementations, the operation 900 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link.

For example, at block 902, the wireless device transmits, to a Bluetooth-enabled peripheral device over a contention-based communication link, one or more first data packets based on a set of transmission parameters. At block 904, the wireless device receives, from the Bluetooth-enabled peripheral device, a buffer status report (BSR) carrying feedback information indicating one or more of a quantity of data packets queued in a receive buffer of the peripheral device, a rate at which the data packets are queued in the receive buffer, and time-of-arrival (TOA) information of the data packets queued in the receive buffer. At block 906, the wireless device adjusts the set of transmission parameters based on the feedback information. At block 908, the wireless device transmits, to the Bluetooth-enabled peripheral device over the contention-based communication link, one or more second data packets based on the adjusted set of transmission parameters.

In some implementations, the data packets may be associated with latency-sensitive traffic having strict end-to-end latency requirements. In some instances, the data packets may be associated with streaming audio or streaming video. In other implementations, the data packets may be associated with real-time traffic (such as a real-time gaming application). In some aspects, the contention-based communication link may be one or more wireless channels in a 2.4 GHz frequency band, a 5 GHZ frequency band, a 6 GHz frequency band, or a 60 GHz frequency band.

The set of transmission parameters may include (but is not limited to) a burst rate, a burst interval, a burst period, or a transmit power level. In some instances, the wireless device can adjust one or more of the transmission parameters based on the feedback information provided by the peripheral device. In some other instances, the wireless device can adjust one or more of the transmission parameters based on the channel conditions of the contention-based communication link. In other implementations, the wireless device can select or change a power save mode or sleep state of the wireless device based on the feedback information.

Figure 10:
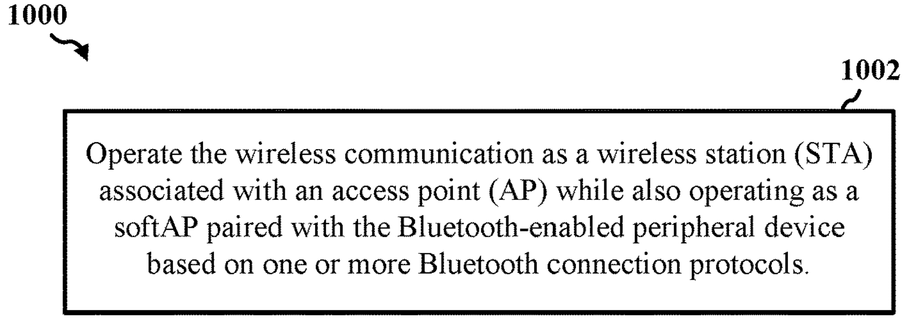

FIG. 10 shows a flowchart illustrating an example operation 1000 for wireless communication that supports streaming Bluetooth data to a peripheral device over a contention-based communication link, according to various aspects of the present disclosure. The operation 1000 may be performed by a wireless device such as the central device 102 of FIG. 1, the wireless device 200 of FIG. 2, or the wireless device 700 of FIG. 7. In some implementations, the operation 1000 may be performed by a wireless device operating as or within a STA. For example, at block 1002, the wireless device operates as a wireless station (STA) associated with an access point (AP) while also operating as a softAP paired with the Bluetooth-enabled peripheral device based on one or more Bluetooth connection protocols. In some implementations, the wireless device is a smartphone, and the peripheral device is one or more headphones, headsets, or pairs of earbuds. In some instances, the audio data is an audio stream associated with a real-time gaming application. In some aspects, the Wi-Fi channel may be one or more wireless channels in a sub-GHz frequency band, a 2.4 GHz frequency band, a 5 GHZ frequency band, a 6 GHz frequency band, or a 60 GHz frequency band.

In some implementations, the one or more second data packets are transmitted to the peripheral device via a P2P link, a TDLS link, or a Wi-Fi Direct link. In some instances, the first and second data packets are PPDUs compliant with the IEEE 802.11 family of wireless communication standards.

Figure 11:
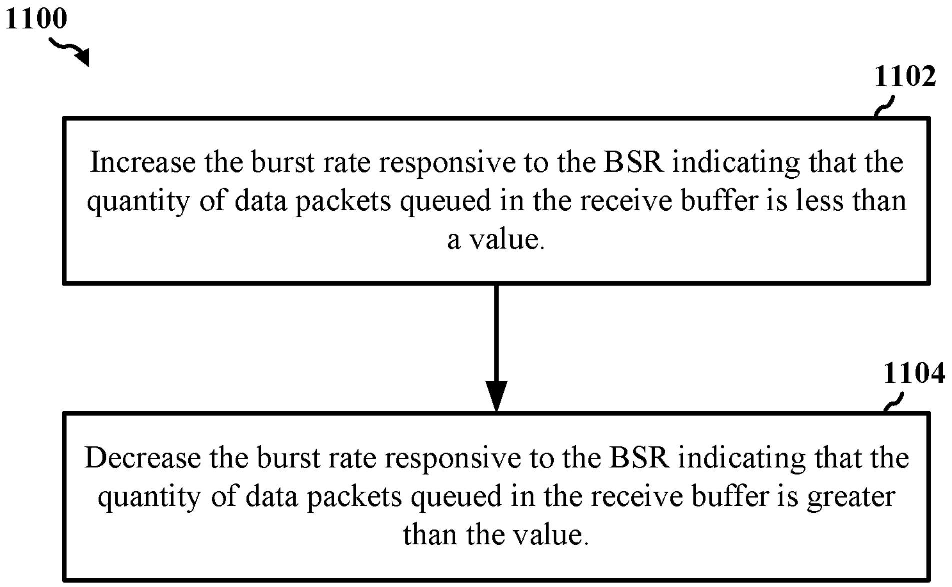

FIG. 11 shows a flowchart illustrating another example operation 1100 for wireless communication that supports transmitting Bluetooth data over a contention-based communication link, according to some implementations. The operation 1100 may be performed by a wireless device such as the central device 102 of FIG. 1, the wireless device 200 of FIG. 2, or the wireless device 700 of FIG. 7. In some implementations, the operation 1100 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link.

In some instances, the operation 1100 may be one example of adjusting the set of transmission parameters in block 906 of FIG. 9. For example, at block 1102, the wireless device increases the burst rate responsive to the BSR indicating that the quantity of data packets queued in the receive buffer is less than a value. At block 1104, the wireless device decreasing the burst rate responsive to the BSR indicating that the quantity of data packets queued in the receive buffer is greater than the value.

Figure 12:
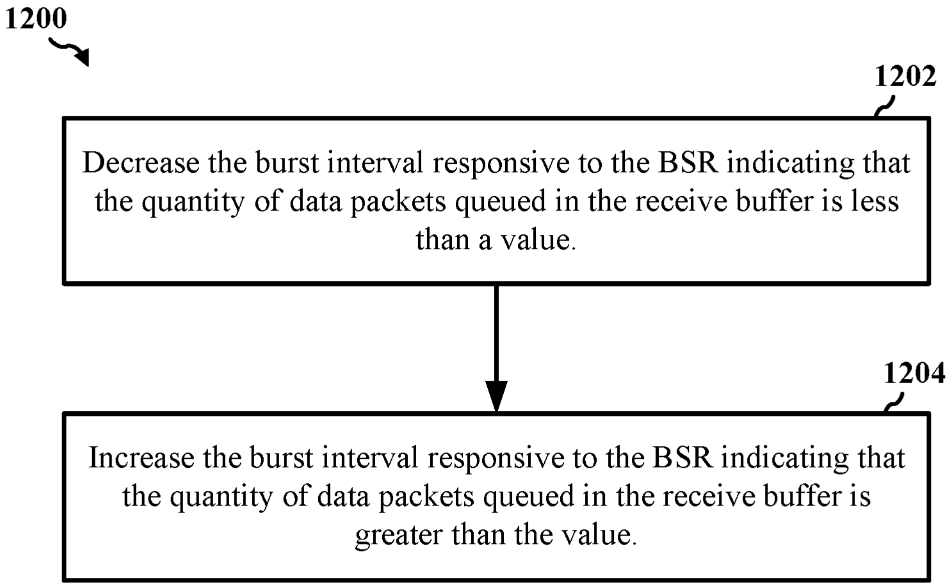

FIG. 12 shows a flowchart illustrating another example operation 1200 for wireless communication that supports transmitting Bluetooth data over a contention-based communication link, according to various aspects of the present disclosure. The operation 1200 may be performed by a wireless device such as the central device 102 of FIG. 1, the wireless device 200 of FIG. 2, or the wireless device 700 of FIG. 7. In some implementations, the operation 1200 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link.

In some instances, the operation 1200 may be another example of adjusting the set of transmission parameters in block 906 of FIG. 9. For example, at block 1202, the wireless device decreases the burst interval responsive to the BSR indicating that the quantity of data packets queued in the receive buffer is less than the value. At block 1204, the wireless device increases the burst interval responsive to the BSR indicating that the quantity of data packets queued in the receive buffer is greater than the value.

Figure 13:
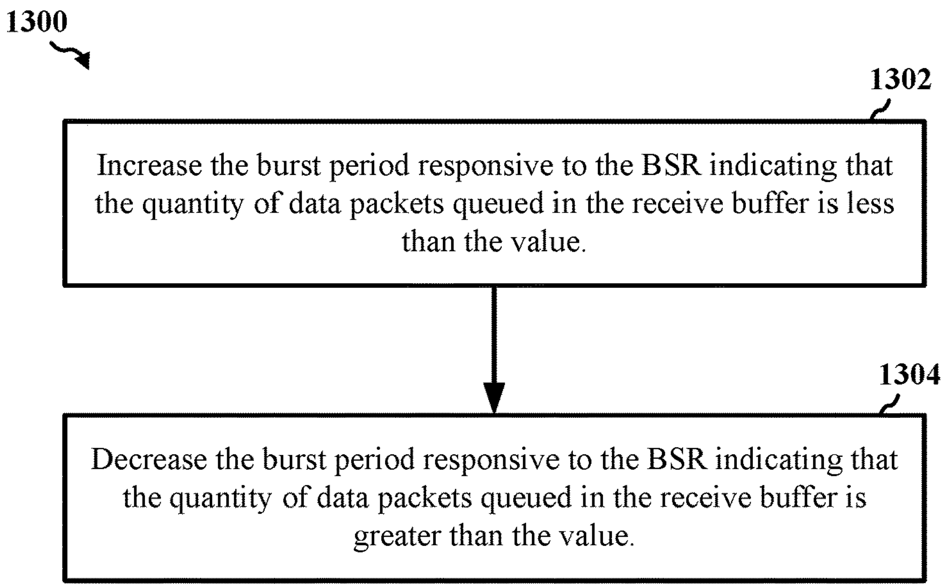

FIG. 13 shows a flowchart illustrating another example operation 1300 for wireless communication that supports transmitting Bluetooth data over a contention-based communication link, according to various aspects of the present disclosure. The operation 1300 may be performed by a wireless device such as the central device 102 of FIG. 1, the wireless device 200 of FIG. 2, or the wireless device 700 of FIG. 7. In some implementations, the operation 1300 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link.

In some instances, the operation 1300 may be another example of adjusting the set of transmission parameters in block 906 of FIG. 9. For example, at block 1302, the wireless device increases the burst period responsive to the BSR indicating that the quantity of data packets queued in the receive buffer is less than the value. At block 1204, the wireless device decreases the burst period responsive to the BSR indicating that the quantity of data packets queued in the receive buffer is greater than the value.

Figure 14:
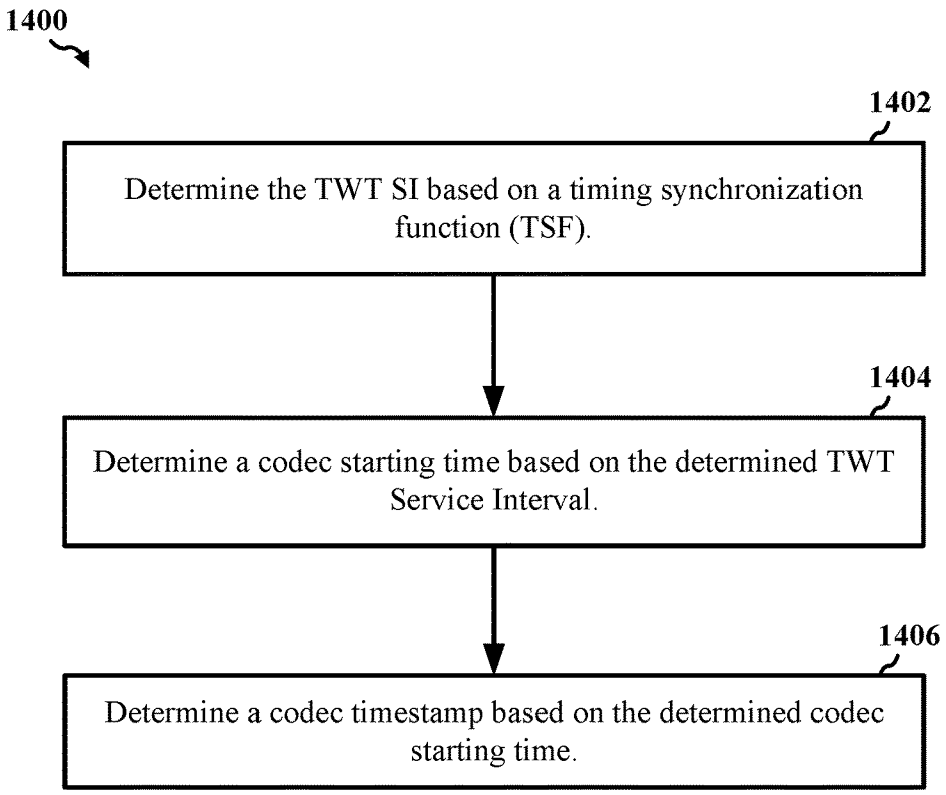

FIG. 14 shows a flowchart illustrating another example operation 1400 for wireless communication that supports transmitting Bluetooth data over a contention-based communication link, according to various aspects of the present disclosure. The operation 1400 may be performed by a wireless device such as the central device 102 of FIG. 1, the wireless device 200 of FIG. 2, or the wireless device 700 of FIG. 7. In some implementations, the operation 1400 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link. In some instances, the peripheral device may be a pair of earbuds.

In some instances, the operation 1400 may be another example of adjusting the set of transmission parameters in block 906 of FIG. 9. For example, at block 1402, the wireless device determines the TWT SI based on a timing synchronization function (TSF). At block 1204, the wireless device determines a codec starting time based on the determined TWT SI. At block 1204, the wireless device determines a codec timestamp based on the determined codec starting time.

Figure 15:
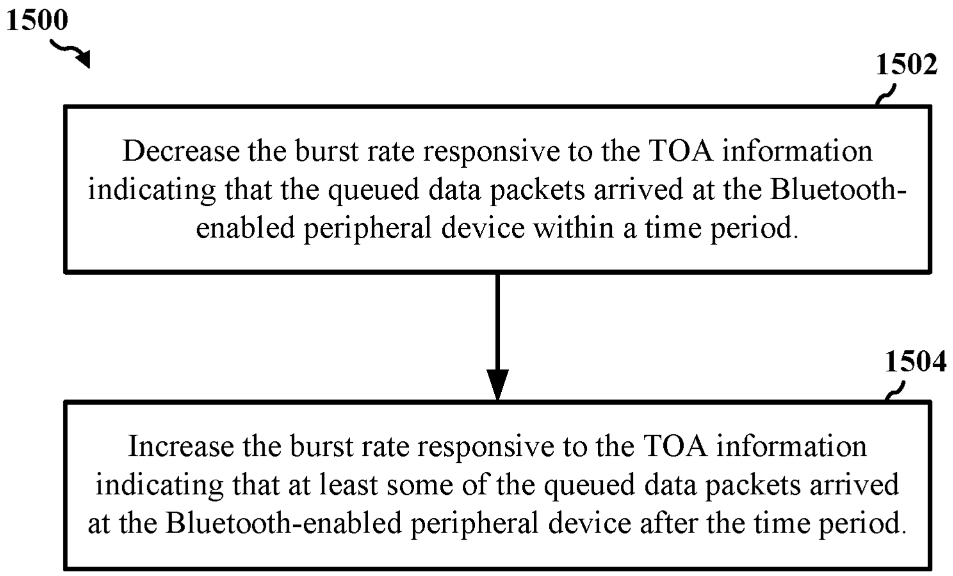

FIG. 15 shows a flowchart illustrating another example operation 1500 for wireless communication that supports transmitting Bluetooth data over a contention-based communication link, according to various aspects of the present disclosure. The operation 1500 may be performed by a wireless device such as the central device 102 of FIG. 1, the wireless device 200 of FIG. 2, or the wireless device 700 of FIG. 7. In some implementations, the operation 1500 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link.

In some instances, the operation 1500 may be another example of adjusting the set of transmission parameters in block 906 of FIG. 9. For example, at block 1502, the wireless device decreases the burst rate responsive to the TOA information indicating that the queued data packets arrived at the Bluetooth-enabled peripheral device within a time period. At block 1504, the wireless device increases the burst rate responsive to the TOA information indicating that at least some of the queued data packets arrived at the Bluetooth-enabled peripheral device after the time period.

Figure 16:
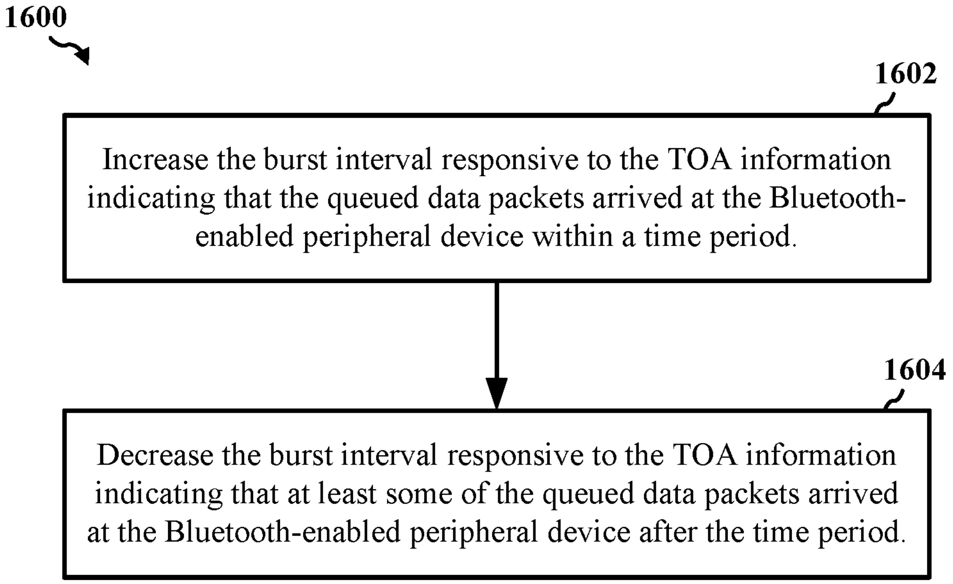

FIG. 16 shows a flowchart illustrating another example operation 1600 for wireless communication that supports transmitting Bluetooth data over a contention-based communication link, according to various aspects of the present disclosure. The operation 1600 may be performed by a wireless device such as the central device 102 of FIG. 1, the wireless device 200 of FIG. 2, or the wireless device 700 of FIG. 7. In some implementations, the operation 1600 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link.

In some instances, the operation 1600 may be another example of adjusting the set of transmission parameters in block 906 of FIG. 9. For example, at block 1602, the wireless device increases the burst interval responsive to the TOA information indicating that the queued data packets arrived at the Bluetooth-enabled peripheral device within the time period. At block 1604, the wireless device decreases the burst interval responsive to the TOA information indicating that at least some of the queued data packets arrived at the Bluetooth-enabled peripheral device after the time period.

Figure 17:
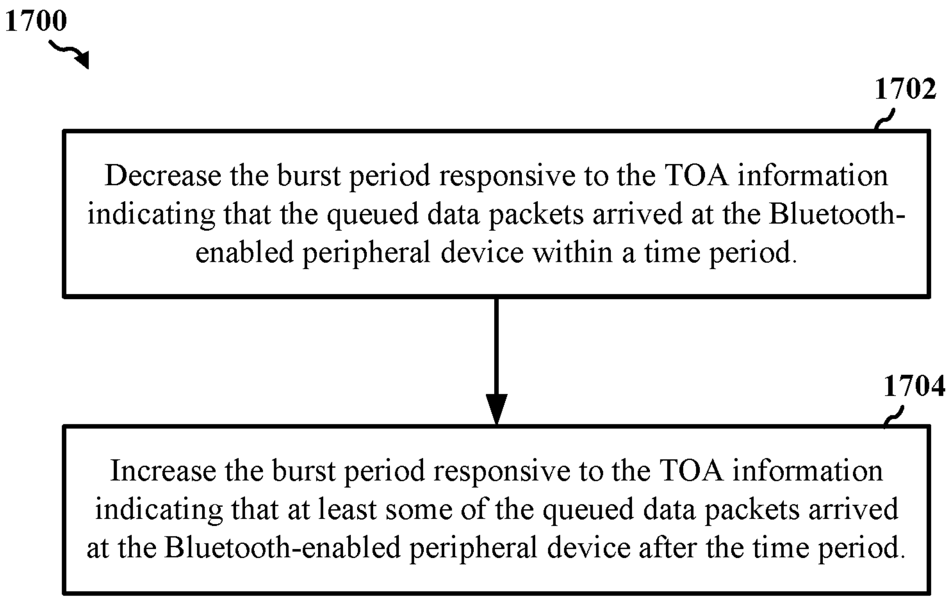

FIG. 17 shows a flowchart illustrating another example operation 1700 for wireless communication that supports transmitting Bluetooth data over a contention-based communication link, according to various aspects of the present disclosure. The operation 1700 may be performed by a wireless device such as the central device 102 of FIG. 1, the wireless device 200 of FIG. 2, or the wireless device 700 of FIG. 7. In some implementations, the operation 1700 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link. In some instances, the peripheral device may be a pair of earbuds.

In some instances, the operation 1700 may be another example of adjusting the set of transmission parameters in block 906 of FIG. 9. For example, at block 1702, the wireless device increases the burst period responsive to the TOA information indicating that the queued data packets arrived at the Bluetooth-enabled peripheral device within a time period. At block 1704, the wireless device increases the burst period responsive to the TOA information indicating that at least some of the queued data packets arrived at the Bluetooth-enabled peripheral device after the time period.

Figure 18:
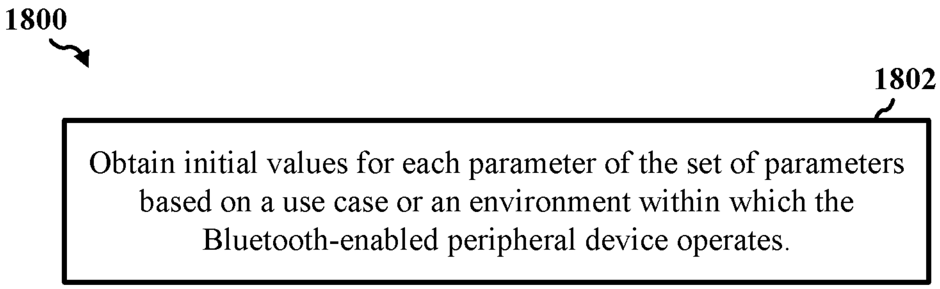

FIG. 18 shows a flowchart illustrating another example operation 1800 for wireless communication that supports transmitting Bluetooth data over a contention-based communication link, according to various aspects of the present disclosure. The operation 1800 may be performed by a wireless device such as the central device 102 of FIG. 1, the wireless device 200 of FIG. 2, or the wireless device 700 of FIG. 7. In some implementations, the operation 1800 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link. In some instances, the peripheral device may be a pair of earbuds.

In some instances, the operation 1800 may be performed in conjunction with the operation 900 of FIG. 9. For example, at block 1802, the wireless device obtains initial values for each parameter of the set of parameters based on a use case or an environment within which the Bluetooth-enabled peripheral device operates.

Figure 19:
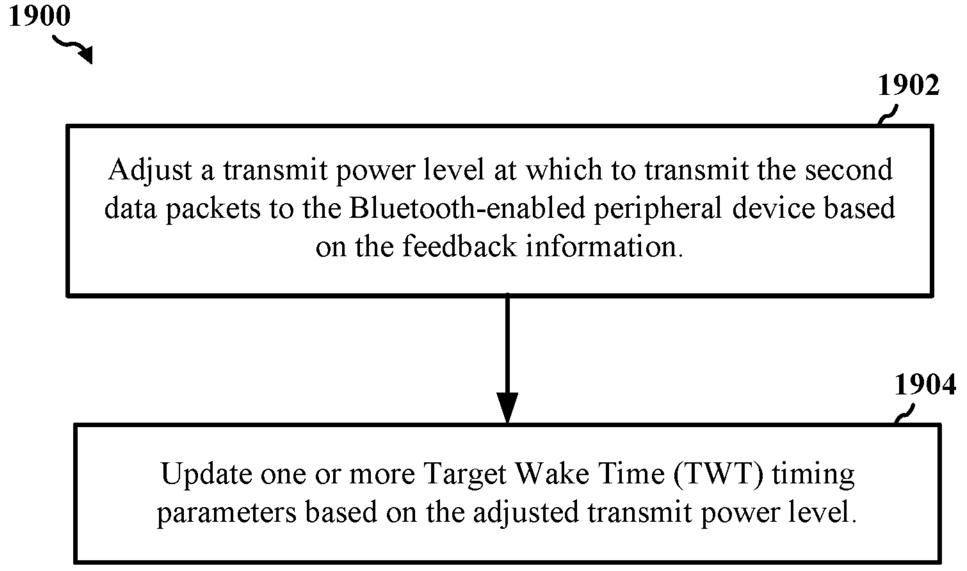

FIG. 19 shows a flowchart illustrating another example operation 1900 for wireless communication that supports transmitting Bluetooth data over a contention-based communication link, according to various aspects of the present disclosure. The operation 1900 may be performed by a wireless device such as the central device 102 of FIG. 1, the wireless device 200 of FIG. 2, or the wireless device 700 of FIG. 7. In some implementations, the operation 1900 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link. In some instances, the peripheral device may be a pair of earbuds.

In some instances, the operation 1900 may be another example of adjusting the set of transmission parameters in block 906 of FIG. 9. For example, at block 1902, the wireless device adjusts a transmit power level at which to transmit the second data packets to the Bluetooth-enabled peripheral device based on the feedback information. At block 1904, the wireless device updates one or more Target Wake Time (TWT) timing parameters based on the adjusted transmit power level.

Figure 20:
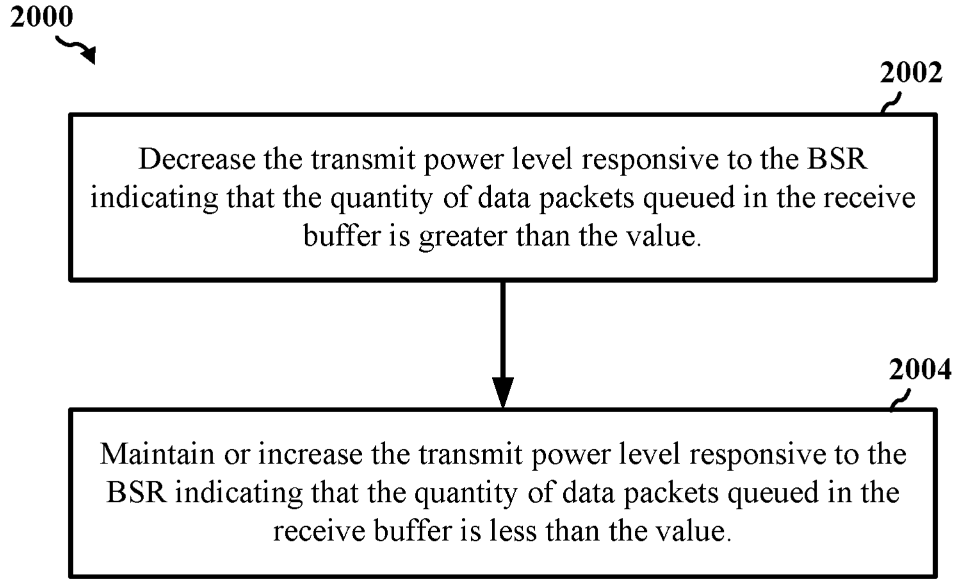

FIG. 20 shows a flowchart illustrating another example operation 2000 for wireless communication that supports transmitting Bluetooth data over a contention-based communication link, according to various aspects of the present disclosure. The operation 2000 may be performed by a wireless device such as the central device 102 of FIG. 1, the wireless device 200 of FIG. 2, or the wireless device 700 of FIG. 7. In some implementations, the operation 2000 may be performed by a wireless device operating as or within a STA. In some aspects, the wireless device operates as a STA that can transmit data to and receive data from an AP via one or more channels of a WLAN, while also operating as a softAP that can transmit data to and receive data from a peripheral device over the contention-based communication link. In some instances, the peripheral device may be a pair of earbuds.

In some instances, the operation 2000 may be an example of adjusting the transmit power level in block 1902 of FIG. 19. For example, at block 2002, the wireless device decreases the transmit power level responsive to the BSR indicating that the quantity of data packets queued in the receive buffer is greater than a value. At block 2004, the wireless device maintains or increases the transmit power level responsive to the BSR indicating that the quantity of data packets queued in the receive buffer is less than the value.

Figure 21:
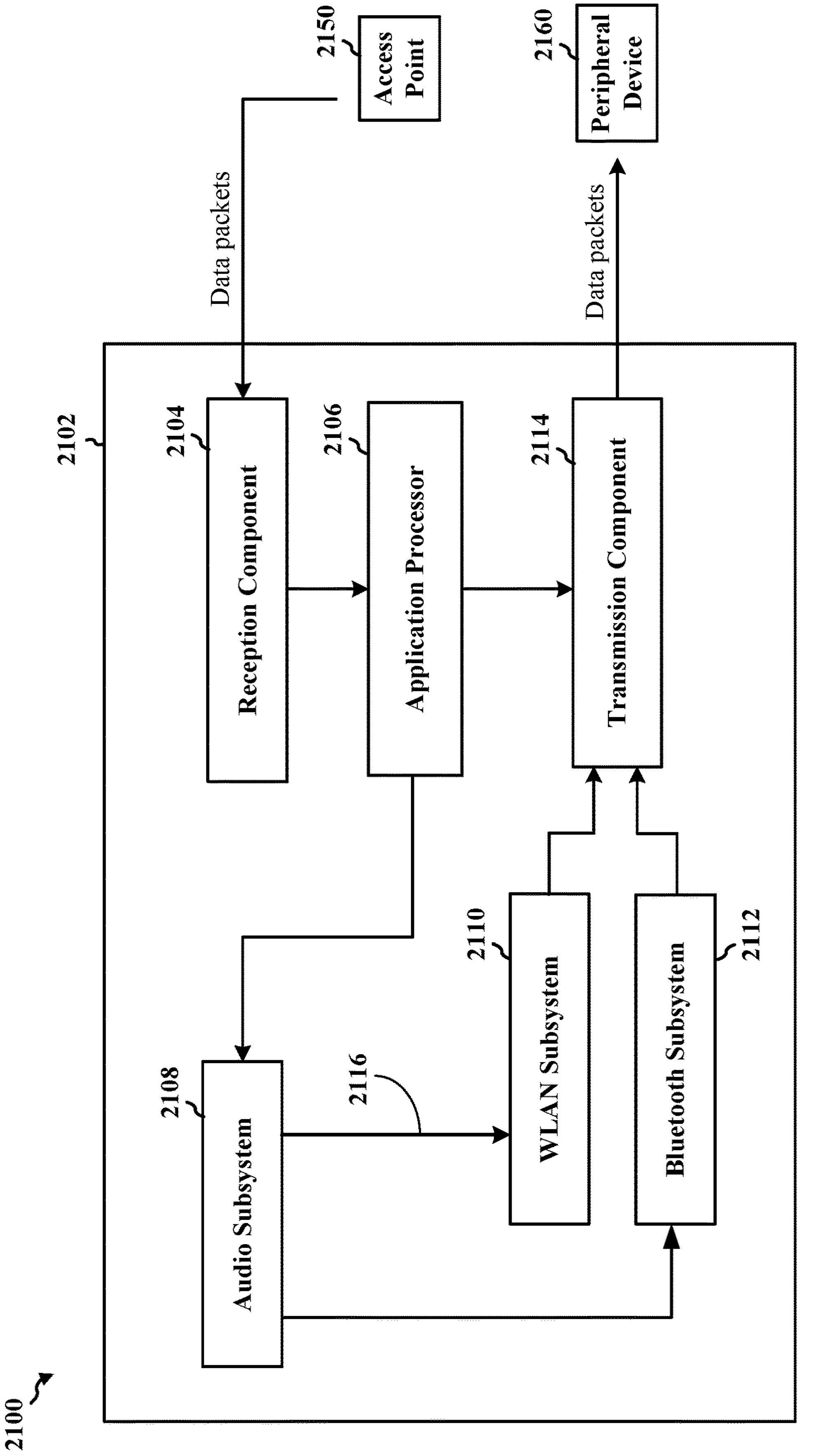
FIG. 21 shows a conceptual data flow diagram illustrating the data flow between different means/components in an example apparatus.

FIG. 21 is a conceptual data flow diagram 2100 illustrating the data flow between different means and/or components of an example apparatus 2102. In some implementations, the apparatus may be a wireless device that operates as a STA associated with an AP while also operating as a softAP associated with a peripheral device 2160. The apparatus includes a reception component 2104 that receives data packets from the AP 2150. The apparatus also includes an application processor 2106, an audio subsystem 2108, a WLAN subsystem 2110, a Bluetooth subsystem 2112, and a transmission component 2114.

The application processor 2106 extracts audio data from the data packets received from the AP 2150, attaches or applies a Bluetooth profile to the extracted audio data, and routes the extracted audio data to the audio subsystem 2108. The audio subsystem 2108 encodes the audio data, and routes the encoded audio data to the WLAN subsystem 2110. The WLAN subsystem 2110 embeds the encoded audio data into Bluetooth frames, and encapsulates the Bluetooth frames within one or more IEEE 802.11-compliant data packets. The Bluetooth subsystem 2112 can establish a Bluetooth session or connection with the peripheral device, and can facilitate the transmission of data and other information to the peripheral device 2160 using Bluetooth communications (e.g., as one or more Bluetooth frames or packets). The transmission component 2114 is coupled to the WLAN subsystem 2110 and the Bluetooth subsystem 2112, and may be used to transmit frames or packets provided by the WLAN subsystem 2110 and/or the Bluetooth subsystem 2112. In some implementations, the transmission component 2114 may transmit data packets containing encoded audio data over a Wi-Fi link or channel to the peripheral device 2160. In some instances, the transmission component 2114 may also transmit data to the peripheral device 2160 over a Bluetooth link or connection. In some other instances, various aspects of the transmission component 2114 may be integrated within each of the WLAN subsystem 2110 and the Bluetooth subsystem 2112.

The apparatus may include additional components that perform each of the blocks of the algorithm in the flowcharts of FIGS. 9-20. As such, each block in the flowcharts of FIGS. 9-20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
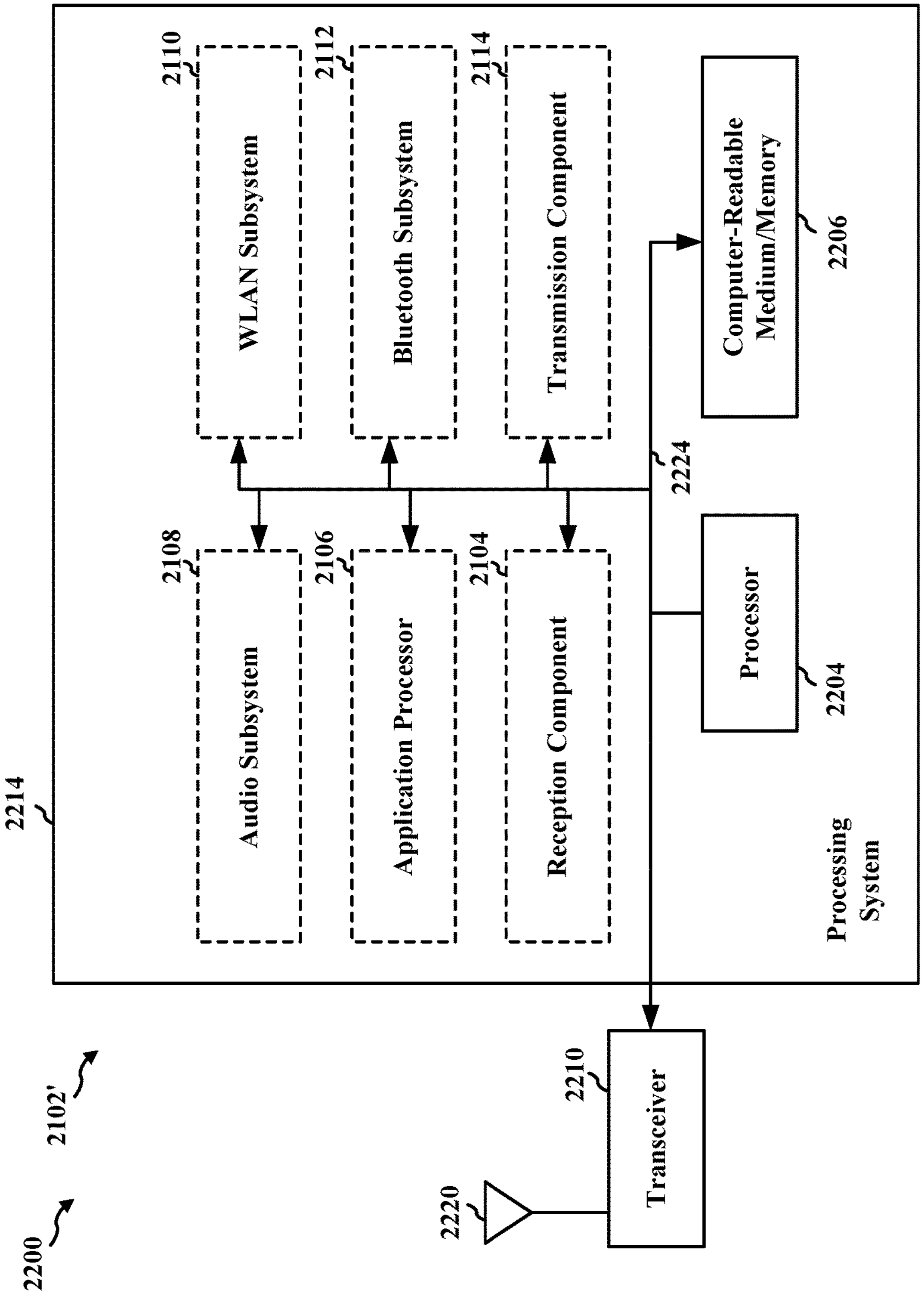
FIG. 22 shows a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112, and 2114 and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2114, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110, 2112, and 2114. The components may be software components running in the processor 2204, resident/stored in the computer readable medium/memory 2206, one or more hardware components coupled to the processor 2204, or some combination thereof.

In certain configurations, the apparatus 2102/2102' for wireless communication may include means for all means limitations described herein. The aforementioned means may be the processor(s) 202, the radio 230, the MMU 240, the WLAN controller 250, the Bluetooth controller 252, the WWAN controller 256, one or more of the aforementioned components of the apparatus 2102 and/or the processing system 2214 of the apparatus 2102' configured to perform the functions recited by the aforementioned means.

In one configuration, the apparatus 2202/2202' for wireless communication includes means for transmitting, to a Bluetooth-enabled peripheral device over a contention-based communication link, one or more first data packets based on a set of transmission parameters; means for receiving, from the Bluetooth-enabled peripheral device, a buffer status report (BSR) carrying feedback information indicating one or more of a quantity of data packets queued in a receive buffer of the peripheral device, a rate at which the data packets are queued in the receive buffer, and time-of-arrival (TOA) information of the data packets queued in the receive buffer: means for adjusting the set of transmission parameters based on the feedback information; and means for transmitting, to the Bluetooth-enabled peripheral device over the contention-based communication link, one or more second data packets based on the adjusted set of transmission parameters. The aforementioned means may be one or more of the aforementioned components of the apparatus 2202 and/or the processing system 2114 of the apparatus 2102' configured to perform the functions recited by the aforementioned means. As described supra, the processing system 2214 may include the processors 202, the memory 206, the flash memory 210, and/or the ROM 208 of FIG. 2.

Implementation examples are described in the following numbered clauses:

1. A method for wireless communication by a wireless device, including:

transmitting, to a Bluetooth-enabled peripheral device over a contention-based communication link, one or more first data packets based on a set of transmission parameters;

receiving, from the Bluetooth-enabled peripheral device, a buffer status report (BSR) carrying feedback information indicating one or more of a quantity of data packets queued in a receive buffer of the peripheral device, a rate at which the data packets are queued in the receive buffer, and time-of-arrival (TOA) information of the data packets queued in the receive buffer:

adjusting the set of transmission parameters based on the feedback information; and transmitting, to the Bluetooth-enabled peripheral device over the contention-based communication link, one or more second data packets based on the adjusted set of transmission parameters.

2. The method of clause 1, further including:

operating the wireless communication as a wireless station (STA) associated with an access point (AP) while also operating as a softAP paired with the Bluetooth-enabled peripheral device based on one or more Bluetooth connection protocols.

3. The method of any one or more of clauses 1-2, where the contention-based communication link includes one or more wireless channels in a 2.4 GHz frequency band, a 5 GHz frequency band, or a 6 GHz frequency band.

4. The method of any one or more of clauses 1-3, where the set of transmission parameters includes one or more of a burst rate, a burst interval, a burst period, or a transmit power level.

5. The method of clause 1, further including:

selecting or changing a power save mode or sleep state of the wireless device based on the feedback information.

6. The method of clause 4, where adjusting the set of transmission parameters includes:

increasing the burst rate responsive to the feedback information indicating that the quantity of data packets queued in the receive buffer is less than a value; or decreasing the burst rate responsive to the feedback information indicating that the quantity of data packets queued in the receive buffer is greater than the value.

7. The method of any one or more of clauses 4-5, where adjusting the set of transmission parameters includes:

decreasing the burst interval responsive to the feedback information indicating that the quantity of data packets queued in the receive buffer is less than the value: or increasing the burst interval responsive to the feedback information indicating that the quantity of data packets queued in the receive buffer is greater than the value.

8. The method of any one or more of clauses 4-6, where adjusting the set of transmission parameters further includes:

increasing the burst period responsive to the feedback information indicating that the quantity of data packets queued in the receive buffer is less than the value: or decreasing the burst period responsive to the feedback information indicating that the quantity of data packets queued in the receive buffer is greater than the value.

9. The method of clause 8, where the first and second data packets include latency-sensitive traffic, the burst period corresponds to a restricted Target Wake Time (r-TWT) Service Period (SP), the burst interval corresponds to a TWT Service Interval (SI), and the contention-based communication link is one of a peer-to-peer (P2P) link, a tunneled direct-link setup (TDLS) link, a Wi-Fi Direct link, a link associated with a Group Owner (GO), or a link associated with a Neighborhood Area Network (NAN).

10. The method of clause 9, further including:

determining the TWT SI based on a timing synchronization function (TSF);

determining a codec starting time based on the determined TWT SI; and determining a codec timestamp based on the determined codec starting time.

11. The method of any one or more of clauses 4-10, where adjusting the set of transmission parameters includes:

decreasing the burst rate responsive to the TOA information indicating that the queued data packets arrived at the Bluetooth-enabled peripheral device within a time period; or increasing the burst rate responsive to the TOA information indicating that at least some of the queued data packets arrived at the Bluetooth-enabled peripheral device after the time period.

12. The method of any one or more of clauses 4-11, where adjusting the set of transmission parameters further includes:

increasing the burst interval responsive to the TOA information indicating that the queued data packets arrived at the Bluetooth-enabled peripheral device within the time period: or decreasing the burst interval responsive to the TOA information indicating that at least some of the queued data packets arrived at the Bluetooth-enabled peripheral device after the time period.

13. The method of any one or more of clauses 4-12, where adjusting the set of transmission parameters further includes:

decreasing the burst period responsive to the TOA information indicating that the queued data packets arrived at the Bluetooth-enabled peripheral device within the time period: or increasing the burst period responsive to the TOA information indicating that at least some of the queued data packets arrived at the Bluetooth-enabled peripheral device after the time period.

14. The method of any one or more of clauses 1-13, where the feedback information further includes channel state information (CSI) of the contention-based communication link, and where adjusting the set of transmission parameters is further based on the CSI.

15. The method of any one or more of clauses 1-14, further including:

obtaining initial values for each parameter of the set of parameters based on a type or class of traffic carried in the data packets.

16. The method of any one or more of clauses 1-15, further including:

adjusting a transmit power level at which to transmit the second data packets to the Bluetooth-enabled peripheral device based on the feedback information.

17. The method of clause 16, further including:

updating one or more Target Wake Time (TWT) timing parameters based on the adjusted transmit power level.

18. The method of any one or more of clauses 16-17, where adjusting the transmit power level further includes:

decreasing the transmit power level responsive to the feedback information indicating that the quantity of data packets queued in the receive buffer is greater than the value; or maintaining or increasing the transmit power level responsive to the feedback information indicating that the quantity of data packets queued in the receive buffer is less than the value.

19. The method of any one or more of clauses 1-18, further including:

selecting or changing a power save mode or a sleep state of the wireless device based on the feedback information.

20. The method of any one or more of clauses 1-19, where the Bluetooth-enabled peripheral device is a pair of earbuds including a primary earbud and a secondary earbud, where each of the primary earbud and the secondary earbud is connected to the wireless device via a peer-to-peer (P2P) link.

21. A wireless device, including:

one or more wireless radios:

one or more processors coupled to the one or more wireless radios; and a memory coupled to the one or more processors and storing instructions that, when executed by the one or more processors in conjunction with the one or more wireless radios, is configured to:

transmit, to a Bluetooth-enabled peripheral device over a contention-based communication link, one or more first data packets based on a set of transmission parameters;

receive, from the Bluetooth-enabled peripheral device, a buffer status report (BSR) carrying feedback information indicating one or more of a quantity of data packets queued in a receive buffer of the peripheral device, a rate at which the data packets are queued in the receive buffer, and time-of-arrival (TOA) information of the data packets queued in the receive buffer;

adjust the set of transmission parameters based on the feedback information;

transmit, to the Bluetooth-enabled peripheral device over the contention-based communication link, one or more second data packets based on the adjusted set of transmission parameters.

22. The wireless device of clause 21, where execution of the instructions by the one or more processors in conjunction with the one or more wireless radios is further configured to:

operate the wireless communication as a wireless station (STA) associated with an access point (AP) while also operating as a softAP paired with the Bluetooth-enabled peripheral device based on one or more Bluetooth connection protocols.

23. The wireless device of any one or more of clauses 21-22, where the contention-based communication link includes one or more wireless channels in a 2.4 GHz frequency band, a 5 GHz frequency band, or a 6 GHz frequency band.

24. The wireless device of any one or more of clauses 21-23, where the set of transmission parameters includes one or more of a burst rate, a burst interval, a burst period, or a transmit power level.

25. The wireless device of clause 24, where adjusting the set of transmission parameters includes:

increasing the burst rate responsive to the feedback information indicating that the quantity of data packets queued in the receive buffer is less than a value; or decreasing the burst rate responsive to the feedback information indicating that the quantity of data packets queued in the receive buffer is greater than the value.

26. The wireless device of any one or more of clauses 24-25, where adjusting the set of transmission parameters includes:

decreasing the burst interval responsive to the feedback information indicating that the quantity of data packets queued in the receive buffer is less than the value: or increasing the burst interval responsive to the feedback information indicating that the quantity of data packets queued in the receive buffer is greater than the value.

27. The wireless device of any one or more of clauses 24-26, where adjusting the set of transmission parameters further includes:

increasing the burst period responsive to the feedback information indicating that the quantity of data packets queued in the receive buffer is less than the value; or decreasing the burst period responsive to the feedback information indicating that the quantity of data packets queued in the receive buffer is greater than the value.

28 The wireless device of clause 27, where the burst interval corresponds to a Target Wake Time (TWT) Service Interval (SI), the burst period corresponds to a TWT Service Period (SP), and execution of the instructions by the one or more processors in conjunction with the one or more wireless radios is further configured to:

determine the TWT SI based on a timing synchronization function (TSF);

determine a codec starting time based on the determined TWT SI; and determine a codec timestamp based on the determined codec starting time.

29. The wireless device of any one or more of clauses 24-28, where adjusting the set of transmission parameters includes:

decreasing the burst rate responsive to the TOA information indicating that the queued data packets arrived at the Bluetooth-enabled peripheral device within a time period: or increasing the burst rate responsive to the TOA information indicating that at least some of the queued data packets arrived at the Bluetooth-enabled peripheral device after the time period.

30. The wireless device of any one or more of clauses 24-29, where adjusting the set of transmission parameters further includes:

increasing the burst interval responsive to the TOA information indicating that the queued data packets arrived at the Bluetooth-enabled peripheral device within the time period: or decreasing the burst interval responsive to the TOA information indicating that at least some of the queued data packets arrived at the Bluetooth-enabled peripheral device after the time period.

31. The wireless device of any one or more of clauses 24-30, where adjusting the set of transmission parameters includes adjusting a transmit power level at which to transmit the second data packets to the Bluetooth-enabled peripheral device by:

decreasing the transmit power level responsive to the feedback information indicating that the quantity of data packets queued in the receive buffer is greater than the value; or maintaining or increasing the transmit power level responsive to the feedback information indicating that the quantity of data packets queued in the receive buffer is less than the value.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A method for wireless communication by a wireless device, comprising:

transmitting, to a Bluetooth-enabled peripheral device over a contention-based communication link, one or more first data packets based on a set of transmission parameters;

receiving, from the Bluetooth-enabled peripheral device, a buffer status report (BSR) carrying feedback information indicating one or more of a quantity of data packets queued in a receive buffer of the peripheral device, a rate at which the data packets are queued in the receive buffer, and time-of-arrival (TOA) information of the data packets queued in the receive buffer;

adjusting the set of transmission parameters based on the feedback information;

transmitting, to the Bluetooth-enabled peripheral device over the contention-based communication link, one or more second data packets based on the adjusted set of transmission parameters;

wherein the set of transmission parameters includes one or more of a burst rate, a burst interval, a burst period, or a transmit power level; and wherein adjusting the set of transmission parameters further includes:

increasing the burst period responsive to the feedback information indicating that the quantity of data packets queued in the receive buffer is less than the value; or decreasing the burst period responsive to the feedback information indicating that the quantity of data packets queued in the receive buffer is greater than the value.

2. The method of claim 1, further comprising:

operating the wireless communication as a wireless station (STA) associated with an access point (AP) while also operating as a software enabled access point (softAP) paired with the Bluetooth-enabled peripheral device based on one or more Bluetooth connection protocols.

3. The method of claim 1, wherein the contention-based communication link comprises one or more wireless channels in a 2.4 GHz frequency band, a 5 GHz frequency band, or a 6 GHz frequency band.

4. The method of claim 1, wherein the Bluetooth-enabled peripheral device comprises a pair of earbuds including a primary earbud and a secondary earbud, wherein each of the primary earbud and the secondary earbud is connected to the wireless device via a peer-to-peer (P2P) link.

5. The method of claim 1, further comprising:

selecting or changing a power save mode or sleep state of the wireless device based on the feedback information.

6. The method of claim 1, further comprising:

adjusting a transmit power level at which to transmit the second data packets to the Bluetooth-enabled peripheral device based on the feedback information.

7. The method of claim 6, further comprising:

updating one or more Target Wake Time (TWT) timing parameters based on the adjusted transmit power level.

8. The method of claim 6, wherein adjusting the transmit power level includes:

decreasing the transmit power level responsive to the feedback information indicating that the quantity of data packets queued in the receive buffer is greater than the value; or maintaining or increasing the transmit power level responsive to the feedback information indicating that the quantity of data packets queued in the receive buffer is less than the value.

9. The method of claim 1, wherein the first and second data packets comprise latency-sensitive traffic, the burst period corresponds to a restricted Target Wake Time (r-TWT) Service Period (SP), the burst interval corresponds to a TWT Service Interval (SI), and the contention-based communication link comprises one of a peer-to-peer (P2P) link, a tunneled direct-link setup (TDLS) link, a Wi-Fi Direct link, a link associated with a Group Owner (GO), or a link associated with a Neighborhood Area Network (NAN).

10. The method of claim 9, further comprising:

determining the TWT SI based on a timing synchronization function (TSF);

determining a codec starting time based on the determined TWT SI; and determining a codec timestamp based on the determined codec starting time.

11. The method of claim 1, wherein the feedback information further includes channel state information (CSI) of the contention-based communication link, and wherein adjusting the set of transmission parameters is further based on the CSI.

12. The method of claim 1, further comprising:

obtaining initial values for each parameter of the set of parameters based on a type or class of traffic carried in the data packets.

13. The method of claim 1, further comprising:

selecting or changing a power save mode or a sleep state of the wireless device based on the feedback information.

14. A wireless device, comprising:

one or more wireless radios;

one or more processors coupled to the one or more wireless radios; and a memory coupled to the one or more processors and storing instructions that, when executed by the one or more processors in conjunction with the one or more wireless radios, is configured to:

transmit, to a Bluetooth-enabled peripheral device over a contention-based communication link, one or more first data packets based on a set of transmission parameters;

receive, from the Bluetooth-enabled peripheral device, a buffer status report (BSR) carrying feedback information indicating one or more of a quantity of data packets queued in a receive buffer of the peripheral device, a rate at which the data packets are queued in the receive buffer, and time-of-arrival (TOA) information of the data packets queued in the receive buffer;

adjust the set of transmission parameters based on the feedback information;

transmit, to the Bluetooth-enabled peripheral device over the contention-based communication link, one or more second data packets based on the adjusted set of transmission parameters;

wherein the set of transmission parameters includes one or more of a burst rate, a burst interval, a burst period, or a transmit power level; and wherein adjusting the set of transmission parameters further includes:

increasing the burst period responsive to the feedback information indicating that the quantity of data packets queued in the receive buffer is less than the value; or decreasing the burst period responsive to the feedback information indicating that the quantity of data packets queued in the receive buffer is greater than the value.

15. The wireless device of claim 14, wherein execution of the instructions by the one or more processors in conjunction with the one or more wireless radios is further configured to:

operate the wireless communication as a wireless station (STA) associated with an access point (AP) while also operating as a software enabled access point (softAP) paired with the Bluetooth-enabled peripheral device based on one or more Bluetooth connection protocols.

16. The wireless device of claim 14, wherein the contention-based communication link comprises one or more wireless channels in a 2.4 GHz frequency band, a 5 GHz frequency band, or a 6 GHz frequency band.

17. The wireless device of claim 14, wherein the burst interval corresponds to a Target Wake Time (TWT) Service Interval (SI), the burst period corresponds to a TWT Service Period (SP), and execution of the instructions by the one or more processors in conjunction with the one or more wireless radios is further configured to:

determine the TWT SI based on a timing synchronization function (TSF);

determine a codec starting time based on the determined TWT SI; and determine a codec timestamp based on the determined codec starting time.

* * * * *